(12) United States Patent
Uwabata et al.

(10) Patent No.: US 6,912,015 B1
(45) Date of Patent: Jun. 28, 2005

(54) VIDEO DISPLAY APPARATUS WITH VERTICAL SCAN VELOCITY MODULATION AND VIDEO DISPLAY METHOD THEREOF

(75) Inventors: Hideyo Uwabata, Takatsuki (JP); Katsumi Terai, Higashiosaka (JP); Minoru Miyata, Suita (JP); Toshiaki Kitahara, Ibaraki (JP); Naoji Okumura, Minoo (JP); Kazuto Tanaka, Otsu (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/719,397

(22) PCT Filed: Jun. 7, 1999

(86) PCT No.: PCT/JP99/03035

§ 371 (c)(1),
(2), (4) Date: Dec. 12, 2000

(87) PCT Pub. No.: WO99/65227

PCT Pub. Date: Dec. 16, 1999

(30) Foreign Application Priority Data

Jun. 12, 1998 (JP) ............................................. 10/164913
Feb. 12, 1999 (JP) ............................................. 11/035006
May 19, 1999 (JP) ............................................. 11/138395

(51) Int. Cl.⁷ .............................. H04N 3/32; H04N 5/44
(52) U.S. Cl. ......................... 348/626; 348/625; 348/627
(58) Field of Search ................................. 348/626, 625, 348/627, 806, 563, 564; 345/13, 23, 12, 14; H04N 3/32, 5/44

(56) References Cited

U.S. PATENT DOCUMENTS 5,223,769 A * 6/1993 Priere et al. ................. 348/626
5,351,094 A * 9/1994 Washino ...................... 348/626
5,396,157 A * 3/1995 Hackett et al. .............. 348/626
5,592,230 A * 1/1997 Yoshino ....................... 348/448
5,912,715 A * 6/1999 Hanai .......................... 348/626
6,529,176 B1 * 3/2003 Okumura et al. ............. 345/13

FOREIGN PATENT DOCUMENTS

| EP | 0 567 931 | 11/1993 | |
|---|---|---|---|
| EP | 0 567931 | 11/1993 | |
| JP | 6-284309 | 10/1994 | |
| JP | 06-284309 | * 10/1994 | ............ H04N/3/32 |
| JP | 10-23290 | 1/1998 | |
| WO | 92/05661 | 4/1992 | |
| WO | WO92/05661 | 4/1992 | |

OTHER PUBLICATIONS

Copy of European Patent Office Communication including European Search Report for corresponding European Patent Application 02004854 dated Jun. 12, 2002.
Copy of European Office Communication including European Search Report for corresponding European Patent Application 02004853 dated Jun. 6, 2002.

* cited by examiner

*Primary Examiner*—John Miller
*Assistant Examiner*—Trang U. Tran
(74) *Attorney, Agent, or Firm*—Armstrong, Kratz, Quintos, Hanson & Brooks, LLP

(57) ABSTRACT

A parallel scanning circuit outputs a parallel scanning signal for making forward and backward scanning lines parallel. A vertical correlation detection circuit detects a portion where the change in luminance in the vertical direction exceeds a predetermined value on the basis of a luminance signal, and outputs a movement control signal representing the distance of movement on the screen of the scanning line. A retrace period reversion circuit reverses the lime axis of the movement control signal in a retrace period. A clamping circuit clamps the movement control signal to a predetermined DC voltage at the timing of horizontal synchronizing signal. A synthesizing circuit synthesizes the parallel scanning signal and the movement control signal, and feeds a synthesized signal as a vertical velocity modulation signal to a vertical velocity modulation coil.

24 Claims, 29 Drawing Sheets

FIG. 10

| MTHn | DISTANCE OF MOVEMENT |
|---|---|
| n = 0 | 0 0 0 0 |
| n = 1 | 0 0 0 1 |
| n = 2 | 0 0 1 0 |
| n = 3 | 0 0 1 1 |
| n = 4 | 0 1 0 0 |
| n = 5 | 0 1 0 1 |
| n = 6 | 0 1 1 0 |
| n = 7 | 0 1 1 1 |

FIG. 11

| MTHn | DISTANCE OF MOVEMENT |
|---|---|
| n = 0 | 0 0 0 0 |
| n = 1 | 0 0 0 0 |
| n = 2 | 0 0 0 0 |
| n = 3 | 0 0 1 1 |
| n = 4 | 0 1 0 0 |
| n = 5 | 0 1 0 1 |
| n = 6 | 0 1 1 0 |
| n = 7 | 0 1 1 1 |

FIG. 12

| MTHn  | DISTANCE OF MOVEMENT |
|-------|----------------------|
| n = 0 | 0 0 0 0              |
| n = 1 | 0 0 0 0              |
| n = 2 | 0 0 0 0              |
| n = 3 | 0 0 0 0              |
| n = 4 | 0 1 1 1              |
| n = 5 | 0 1 1 1              |
| n = 6 | 0 1 1 1              |
| n = 7 | 0 1 1 1              |

FIG. 13

| MTHn  | DISTANCE OF MOVEMENT |
|-------|----------------------|
| n = 0 | 0 0 0 0              |
| n = 1 | 0 0 0 0              |
| n = 2 | 0 0 0 0              |
| n = 3 | 0 0 0 1              |
| n = 4 | 0 0 1 0              |
| n = 5 | 0 0 1 1              |
| n = 6 | 0 1 0 0              |
| n = 7 | 0 1 0 1              |

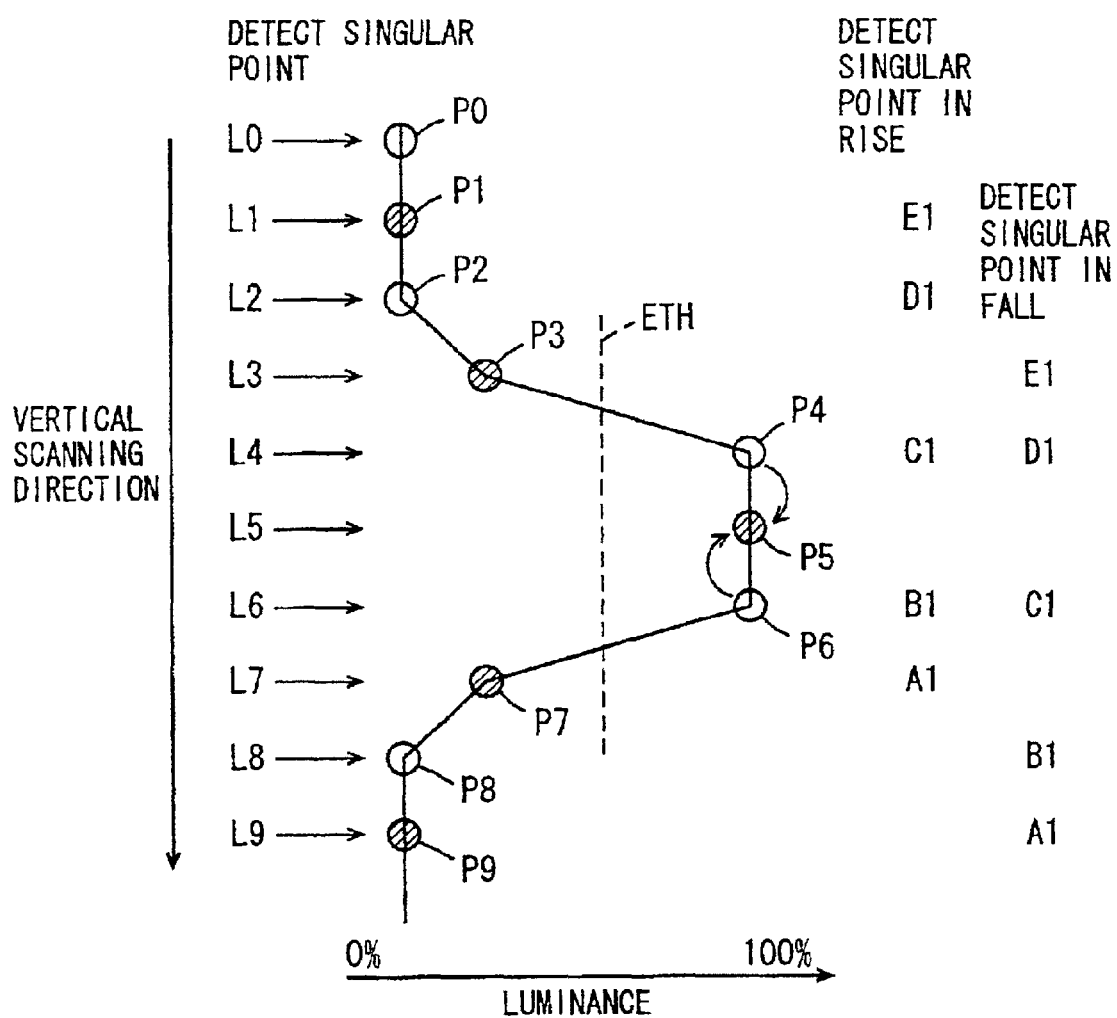

F I G. 2 1

| A1 | B1 | C1 | D1 | E1 | F1 | G1 | H1 |
|----|----|----|----|----|----|----|----|
| 0  | 0  | 0  | 0  | 0  | 0  | 0  | 0  |
| 0  | 0  | 0  | 0  | 1  | 0  | 0  | 0  |
| 0  | 0  | 0  | 1  | 0  | 0  | 0  | 0  |
| 0  | 0  | 0  | 1  | 1  | 0  | 0  | 0  |
| 0  | 0  | 1  | 0  | 0  | 0  | 0  | 0  |
| 0  | 0  | 1  | 0  | 1  | 0  | 0  | 0  |
| 0  | 0  | 1  | 1  | 0  | 1  | 0  | 1  |
| 0  | 0  | 1  | 1  | 1  | 0  | 0  | 0  |
| 0  | 1  | 0  | 0  | 0  | 0  | 0  | 0  |
| 0  | 1  | 0  | 0  | 1  | 0  | 0  | 0  |
| 0  | 1  | 0  | 1  | 0  | 0  | 0  | 0  |
| 0  | 1  | 0  | 1  | 1  | 0  | 0  | 0  |
| 0  | 1  | 1  | 0  | 0  | 0  | 1  | 1  |
| 0  | 1  | 1  | 0  | 1  | 0  | 1  | 1  |
| 0  | 1  | 1  | 1  | 0  | 0  | 0  | 0  |
| 0  | 1  | 1  | 1  | 1  | 0  | 0  | 0  |
| 1  | 0  | 0  | 0  | 0  | 0  | 0  | 0  |
| 1  | 0  | 0  | 0  | 1  | 0  | 0  | 0  |
| 1  | 0  | 0  | 1  | 0  | 0  | 0  | 0  |
| 1  | 0  | 0  | 1  | 1  | 0  | 0  | 0  |
| 1  | 0  | 1  | 0  | 0  | 0  | 0  | 0  |
| 1  | 0  | 1  | 0  | 1  | 0  | 0  | 0  |
| 1  | 0  | 1  | 1  | 0  | 1  | 0  | 1  |
| 1  | 0  | 1  | 1  | 1  | 0  | 0  | 0  |
| 1  | 1  | 0  | 0  | 0  | 0  | 0  | 0  |
| 1  | 1  | 0  | 0  | 1  | 0  | 0  | 0  |
| 1  | 1  | 0  | 1  | 0  | 0  | 0  | 0  |
| 1  | 1  | 0  | 1  | 1  | 0  | 0  | 0  |
| 1  | 1  | 1  | 0  | 0  | 0  | 0  | 0  |
| 1  | 1  | 1  | 0  | 1  | 0  | 0  | 0  |
| 1  | 1  | 1  | 1  | 0  | 0  | 0  | 0  |
| 1  | 1  | 1  | 1  | 1  | 0  | 0  | 0  |

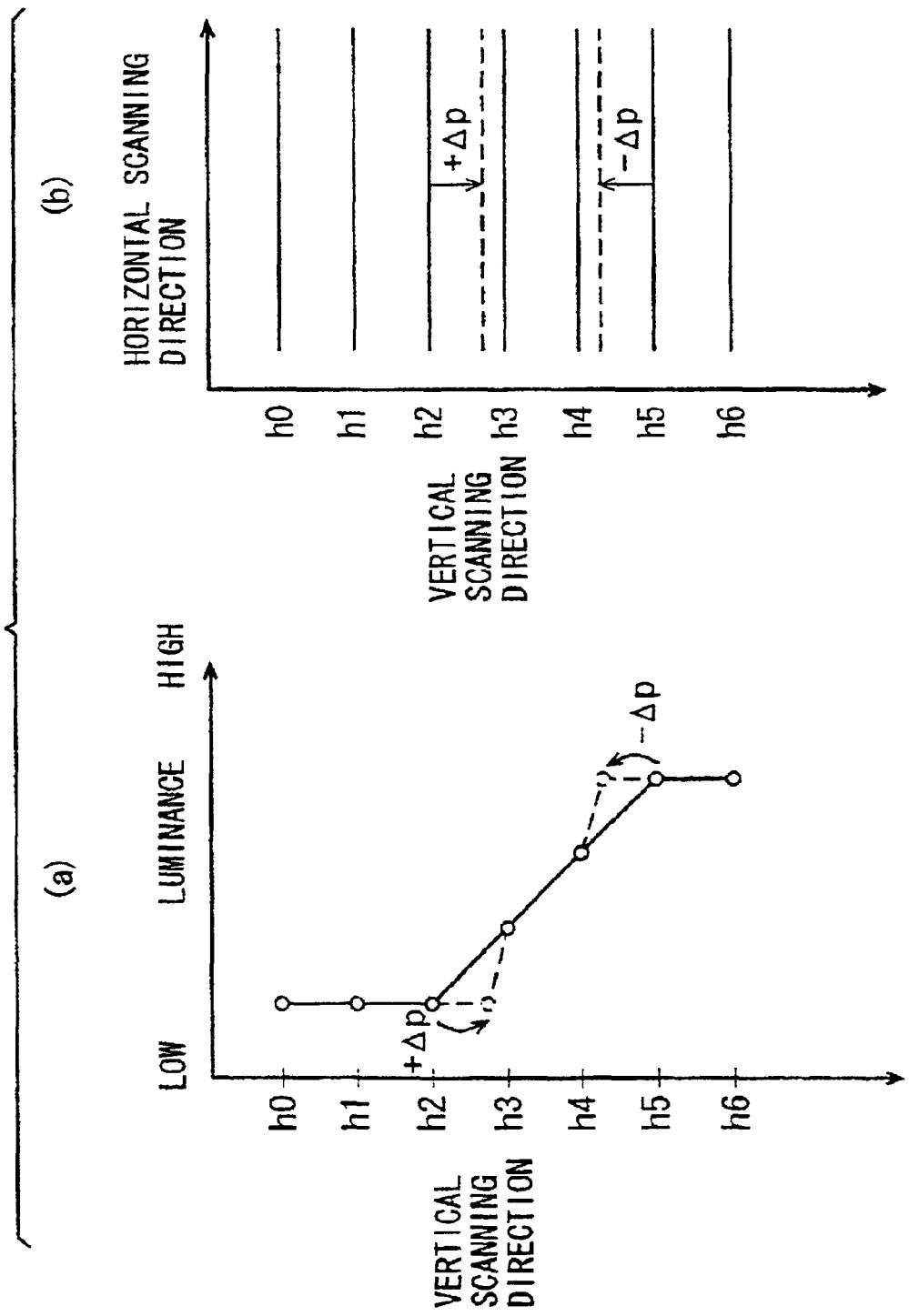

VIDEO DISPLAY APPARATUS WITH VERTICAL SCAN VELOCITY MODULATION AND VIDEO DISPLAY METHOD THEREOF

BACKGROUND OF THE INVENTION

1. Field of the Invention

The present invention relates to a vertical velocity modulation apparatus having the function of correcting the image quality by modulating the scanning speed of an electron beam, and a video display apparatus and a video display method using the same.

2. Description of the Related Art

In a conventional video display apparatus such as a television receiver or a display monitor, a unidirectional scanning system has been generally used. FIG. 31 is a diagram showing a conventional unidirectional progressive scanning system. As shown in FIG. 31, in the unidirectional progressive scanning system, scanning is performed slightly downward from the left to the right of a screen. In a progressive scanning system of 525 scanning lines, the horizontal scanning frequency is 31.5 KHz, and the horizontal scanning period is 31.75 $\mu$s.

In recent years, a bidirectional scanning system has been proposed in order to improve the image quality. FIG. 32 is a diagram showing a bidirectional progressive scanning system. As shown in FIG. 32, scanning lines in odd numbers are horizontally scanned from the left to the right of a screen, and scanning lines in even numbers are horizontally scanned from the right to the left of the screen. In a bidirectional progressive scanning system of 1050 scanning lines, the horizontal scanning frequency is 63.0 KHz, and the horizontal scanning period is 15.87 $\mu$s.

In the bidirectional scanning system, the density of the scanning lines in the vertical direction doubles, so that the resolution is increased, and the luminance is improved. Since reciprocating scanning is performed, power for deflecting an electron beam is reduced, thereby making it possible to reduce the scale of a power supply circuit.

In the bidirectional scanning system, however, the interval between the scanning lines is shortened, so that the luminance of each of the scanning lines is easily affected by the luminance of the adjacent scanning line. Consequently, the sharpness of a reproduced image may, in some cases, be reduced.

For example, Japanese Laid-open Patent 10-23290 discloses that the velocity of an electron beam is modulated in the vertical direction, to make vertical contour correction.

In velocity modulation in the vertical direction which is disclosed in Japanese Laid-open Patent 10-23290, a scanning line having a low luminance is brought near a scanning line having a high luminance at a change point from a low luminance level to a high luminance level, and a scanning line having a high luminance is brought near a scanning line having a low luminance at a change point from a high luminance level to a low luminance level. For example, a scanning line h2 having a low luminance is shifted by $\Delta p$ downward, and a scanning line h5 having a high luminance is shifted by $\Delta p$ upward.

As described in Japanese Laid-open Patent 10-23290, the luminance is high in a portion where the interval between the scanning lines is narrow, while being low in a portion where the interval between the scanning lines is wide. As a result, the change in the luminance of the luminance change portion, for example, a vertical contour portion of an image can be sharp.

According to the conventional method of modulating the scanning speed in the vertical direction, however, there arises such a phenomenon that an originally dark portion is brightened, so that the contour is rather blurred.

An object of the present invention is to provide a vertical velocity modulation apparatus capable of obtaining a sharper reproduced image by modulating the scanning speed in the vertical direction, and a video display apparatus and a video display method using the same.

Another object of the present invention is to provide a vertical velocity modulation apparatus which can obtain a sharper reproduced image by modulating the scanning speed in the vertical direction and can be miniaturized and reduced in cost, and a video display apparatus and a video display method using the same.

SUMMARY OF THE INVENTION

A video display apparatus according to one aspect of the present invention comprises a horizontal deflection circuit for deflecting an electron beam in the horizontal direction to form scanning lines in the horizontal direction on a screen, a vertical deflection circuit for deflecting the electron beam in the vertical direction, and a vertical velocity modulation circuit for modulating the scanning speed in the vertical direction of the electron beam such that a part of the scanning line having a luminance which is not less than a predetermined value in a luminance change portion in the vertical direction moves farther apart from a part of the adjacent scanning line having a lower luminance than the predetermined value.

In the video display apparatus, the electron beam is deflected in the horizontal direction and the vertical direction, so that the scanning lines in the horizontal direction are successively formed on the screen. In this case, the scanning speed in the vertical direction of the electron beam is modulated such that the part of the scanning line having a luminance which is not less than the predetermined value in the luminance change portion in the vertical direction moves farther apart from the adjacent scanning line having a lower luminance than the predetermined value.

Consequently, the part of the scanning line having a high luminance is shifted in the direction away from the part of the scanning line having a low luminance. Accordingly, the part of the scanning line having a low luminance is not easily affected by the part of the adjacent scanning line having a high luminance, so that the part of the scanning line having a high luminance enters the original low luminance level. Further, the part of the scanning line having a high luminance is in close proximity to the part of the scanning line having a higher luminance, so that the part of the scanning line having a high luminance enters a level higher than the original luminance level. As a result, the contour in the vertical direction of a reproduced image is emphasized.

The horizontal deflection circuit may deflect the electron beam back and forth in the horizontal direction, to form forward and backward scanning lines on the screen.

In this case, the reproduced image having a high density is obtained by bidirectional scanning, and the contour of the image in the vertical direction is emphasized by modulating the scanning speed in the vertical direction. As a result, the quality of the image is increased.

The vertical velocity modulation circuit may comprise a parallel scanning circuit for outputting a parallel scanning signal for making the forward and backward scanning lines formed by the horizontal deflection circuit parallel, a movement control circuit for producing a movement control signal for controlling the movement in the vertical direction of the scanning lines on the basis of a luminance signal, a synthesizing circuit for synthesizing the parallel scanning signal outputted by the parallel scanning circuit and the movement control signal produced by the movement control circuit, and a vertical velocity modulation coil for generating a magnetic field for modulating the scanning speed in the vertical direction of the electron beam on the basis of a signal synthesized by the synthesizing circuit.

In this case, the parallel scanning signal for making the forward and backward scanning lines parallel and the movement control signal for controlling the movement in the vertical direction of the scanning lines are synthesized, and a magnetic field for modulating the scanning speed in the vertical direction of the electron beam is generated by the vertical velocity modulation coil on the basis of the synthesized signal. The parallel scanning and the modulation of the scanning speed in the vertical direction are performed by the common vertical velocity modulation coil. Therefore, the video display apparatus is miniaturized and is reduced in cost.

The movement control circuit may comprise a change portion detection circuit for detecting a luminance change portion in the vertical direction on the basis of the luminance signal, a movement distance output circuit for outputting as the movement control signal the distance of movement of the scanning line on the screen in the vertical direction in the luminance change portion detected by the change portion detection circuit on the basis of the luminance signal, and a time axis reversion circuit for reversing the time axis of the movement control signal outputted by the movement distance output circuit in backward scanning by the horizontal deflection circuit.

In this case, the luminance change portion in the vertical direction is detected on the basis of the luminance signal, and the distance of movement of the scanning line on the screen in the vertical direction in the luminance change portion is outputted as the movement control signal. The time axis of the movement control signal is reversed in the backward scanning. Consequently, it is possible to modulate the scanning speed in the vertical direction in the bidirectional scanning.

The vertical velocity modulation circuit may further comprise a clamping circuit for clamping the movement control signal produced by the movement control circuit to a predetermined potential at predetermined timing.

In this case, the movement control signal is clamped to the predetermined potential at predetermined timing, so that each of the scanning lines is formed at a reference position previously set, and the part of each of the scanning lines can be moved from the reference position in the luminance change portion in the vertical direction. Consequently, the image quality is prevented from being degraded by the shift of the scanning line.

The vertical velocity modulation circuit may further comprise an amplifier for amplifying the signal synthesized by the synthesizing circuit, and a gain control circuit for controlling the gain of the amplifier.

In this case, the signal synthesized by the synthesizing circuit is amplified by the amplifier, and is fed to the vertical velocity modulation coil. Particularly, the gain of the amplifier is controlled by the gain control circuit, thereby making it possible to control the interval between the scanning lines and the distance of movement on the screen of the part of the scanning line in the luminance change portion.

The gain control circuit may control the gain of the amplifier on the basis of the number of the scanning lines formed on the screen by the horizontal deflection circuit.

In this case, it is possible to control the interval between the scanning lines and the distance of movement on the screen of the part of the scanning line in the luminance change portion depending on the number of the scanning lines formed on the screen. Consequently, it is possible to improve the image quality depending on the number of the scanning lines.

The gain control circuit may control the gain of the amplifier depending on the positions of the scanning lines formed on the screen by the horizontal deflection circuit.

In this case, it is possible to control the interval between the scanning lines and the distance of movement on the screen of the part of the scanning line in the luminance change portion depending on the positions of the scanning lines formed on the screen. Consequently, it is possible to improve the image quality depending on the positions on the screen.

The vertical velocity modulation circuit may comprise a movement distance output circuit for outputting the distance of movement on the screen of a part of the scanning line to be an object as the movement control signal on the basis of the difference between the luminance of a part of the scanning line a predetermined number of horizontal scanning periods ahead of and the luminance of a part of the scanning line the predetermined number of horizontal scanning periods behind the part of the scanning line to be the object and the level of the luminance of the part of the scanning line to be the object, and a vertical velocity modulation coil for generating a magnetic field for modulating the scanning speed in the vertical direction of the electron beam on the basis of the movement control signal outputted from the movement distance output circuit.

In this case, the distance of movement on the screen of the part of the scanning line to be the object is set on the basis of the difference between the luminance of the part of the scanning line the predetermined number of scanning lines ahead of and the luminance of the part of the scanning line the predetermined number of scanning lines behind the part of the scanning line to be the object and the level of the luminance of the part of the scanning line to be the object. The part of the scanning line thus moves depending on the amount of the change in the luminance and the level of the luminance, so that the contour in the vertical direction of the reproduced image is emphasized.

The movement distance output circuit may comprise a difference calculation circuit for calculating the difference between the luminance of the part of the scanning line the predetermined number of horizontal scanning periods ahead of and the part of the scanning line the predetermined number of horizontal scanning periods behind the part of the scanning line to be the object, a first signal output circuit for outputting a first movement distance signal on the basis of an output signal of the difference calculation circuit, a second signal output circuit for outputting a second movement distance signal on the basis of the luminance of the part of the scanning line to be the object, and a multiplication circuit for multiplying the first movement distance signal outputted from the first signal output circuit and the second movement distance signal outputted from the second signal output circuit together, and outputting the result of the multiplication as the movement control signal.

In this case, the first movement distance signal is outputted on the basis of the difference between the luminance of the part of the scanning line the predetermined number of scanning lines ahead of and the luminance of the part of the scanning line the predetermined number of scanning lines behind the part of the scanning line to be the object, and the second movement distance signal is outputted on the basis of the luminance of the part of the scanning line to be the object. The first movement distance signal and the second movement distance signal are multiplied together, and the result of the multiplication is outputted as the movement control signal.

The first signal output circuit may set the value of the first movement distance signal to zero when the value of the output signal of the difference calculation circuit is smaller than a predetermined value, and the second signal output circuit may set the value of the second movement distance signal to zero when the luminance of the part of the scanning line to be the object is smaller than the predetermined value.

In this case, the distance of movement on the screen of the part of the scanning line is set to zero such that vertical velocity modulation is not performed when the amount of the change of the luminance is smaller than the predetermined value and the luminance of the part of the scanning line to be the object is smaller than the predetermined value.

The scanning line the predetermined number of horizontal scanning periods ahead of the part of the scanning line to be the object may be the scanning line two horizontal scanning periods ahead of the part of the scanning line to be the object, and the scanning line the predetermined number of horizontal scanning periods behind the part of the scanning line to be the object may be the scanning line two horizontal scanning periods behind the part of the scanning line to be the object.

In this case, the distance of movement on the screen of the part of the scanning line to be the object is set on the basis of the difference between the luminance of the part of the scanning line two scanning lines ahead of and the luminance of the part of the scanning line two scanning lines behind the part of the scanning line to be the object and the luminance of the part of the scanning line to be the object.

The scanning line the predetermined number of horizontal scanning periods ahead of the part of the scanning line to be the object may be the scanning line one horizontal scanning period ahead of the part of the scanning line to be the object, and the scanning line the predetermined number of horizontal scanning periods behind the part of the scanning line to be the object may be the scanning line one horizontal scanning period behind the part of the scanning line to be the object.

In this case, the distance of movement on the screen of the part of the scanning line to be the object is set on the basis of the difference between the luminance of the part of the scanning line one scanning line ahead of and the luminance of the part of the scanning line one scanning line behind the part of the scanning line to be the object and the luminance of the part of the scanning line.

The vertical velocity modulation circuit may further comprise a movement distance limitation circuit for limiting the distance of movement on the screen of the part of the scanning line such that the positions of the adjacent scanning lines are not replaced with each other by the movement of the part of the scanning line.

In this case, the distance of movement on the screen of the part of the scanning line is limited such that the positions of the adjacent scanning lines are not replaced with each other by moving the part of the scanning line, so that the image quality is not degraded.

The movement distance limitation circuit may limit the movement control signal outputted from the movement distance output circuit to half when the luminance of the part of the scanning line to be the object and the luminance of the part of the scanning line two horizontal scanning periods behind the part of the scanning line to be the object are not less than the predetermined value, and the luminance of the part of the scanning line two horizontal scanning periods ahead of, the luminance of the part of the scanning line three horizontal scanning periods ahead of, and the luminance of the part of the scanning line three horizontal scanning periods behind the part of the scanning line to be the object are less than the predetermined value, or when the luminance of the part of the scanning line to be the object and the luminance of the part of the scanning line two horizontal scanning periods ahead of the part of the scanning line to be the object are not less than the predetermined value, and the luminance of the part of the scanning line two horizontal scanning periods behind, the luminance of the part of the scanning line three horizontal scanning periods behind, and the luminance of the part of the scanning line three horizontal scanning periods ahead of the part of the scanning line to be the object are less than the predetermined value.

In this case, when the luminances of the parts of the three adjacent scanning lines are not less than the predetermined value, and the luminance of the part of the scanning line ahead of the three scanning lines and the part of the scanning line behind the three scanning lines are less than the predetermined value, the parts of the scanning lines on both sides out of the three scanning lines move such that they approach the part of the scanning line at the center and the positions of the three scanning lines are not replaced with one another.

The video display apparatus may further comprise a cathode ray tube(CRT), and an electron gun provided in the CRT and having a metal case, and the vertical velocity modulation circuit may comprise a movement control circuit for producing a movement control signal for controlling the movement in the vertical direction of the scanning lines on the basis of the luminance signal, and a vertical velocity modulation coil disposed in a position departing from the periphery of the metal case of the electron gun and around the CRT for generating a magnetic field for modulating the scanning speed in the vertical direction of the electron beam on the basis of the movement control signal produced by the movement control circuit.

In this case, the magnetic field formed by the vertical velocity modulation coil does not strike the metal case of the electron gun, so that intermediate and high frequency components of the magnetic field are not attenuated. Consequently, the sensitivity of the vertical velocity modulation coil is increased, so that the scanning line can be sharply changed at a small current. Consequently, the scanning line sharply changes in a vertical edge and a horizontal edge of the image, so that the quality of the image is not degraded.

The video display apparatus may further comprise a deflection yoke disposed in the position departing from the periphery of the metal case of the electron gun and around the CRT, and constituting the horizontal deflection circuit and the vertical deflection circuit, and the vertical velocity modulation coil may be arranged inside the deflection yoke.

In this case, the magnetic field formed by the vertical velocity modulation coil does not strike the metal case of the electron gun.

The vertical velocity modulation circuit may comprise a movement control circuit for producing the movement control signal for controlling the movement in the vertical direction of the scanning lines on the basis of the luminance signal, a frequency domain emphasis circuit for emphasizing a predetermined frequency domain of the movement control signal produced by the movement control circuit, and a vertical velocity modulation coil for generating a magnetic field for modulating the scanning speed in the vertical direction of the electron beam on the basis of the movement control signal emphasized by the frequency domain emphasis circuit. In this case, the movement control signal for controlling the movement in the vertical direction of the scanning line is produced on the basis of the luminance signal, the predetermined frequency domain of the produced movement control signal is emphasized, and the scanning speed in the vertical direction of the electron beam is modulated on the basis of the emphasized movement control signal. Consequently, the scanning line sharply changes in the vertical edge and the horizontal edge of the image, so that the quality of the image is not degraded.

The frequency domain emphasis circuit may comprise an extraction circuit for extracting the predetermined frequency domain of the movement control signal produced by the movement control circuit, and an adder for adding the movement control signal produced by the movement control circuit and the signal in the frequency domain extracted by the extraction circuit together.

In this case, the predetermined frequency domain of the movement control signal is extracted, so that the movement control signal and the signal in the extracted frequency domain are added together. Consequently, the predetermined frequency domain of the movement control signal is emphasized.

A vertical velocity modulation apparatus according to another aspect of the present invention is a vertical velocity modulation apparatus for modulating the scanning speed in the vertical direction of an electron beam for successively forming scanning lines in the horizontal direction on a screen, comprising a movement control circuit for producing a movement control signal for controlling the movement in the vertical direction of the scanning lines such that a part of the scanning line having a luminance which is not less than a predetermined value in a luminance change portion in the vertical direction on the basis of a luminance signal moves farther apart from a part of the adjacent scanning line having a lower luminance than the predetermined value, and a vertical velocity modulation coil for generating a magnetic field for modulating the scanning speed in the vertical direction of the electron beam on the basis of the movement control signal produced by the movement control circuit.

In the vertical velocity modulation apparatus, the movement control signal for controlling the movement in the vertical direction of the scanning lines such that the part of the scanning line having a luminance which is not less than the predetermined value in the luminance change portion in the vertical direction moves farther apart from the part of the adjacent scanning line having a lower luminance than the predetermined value is produced on the basis of the luminance signal, and the magnetic field for modulating the scanning speed in the vertical direction of the electron beam is generated on the basis of the movement control signal.

Consequently, the part of the scanning line having a high luminance is shifted in the direction away from the part of the scanning line having a low luminance. Accordingly, the part of the scanning line having a low luminance is not easily affected by the part of the adjacent scanning line having a high luminance, so that the part of the scanning line having a low luminance enters the original low luminance level. Further, the part of the scanning line having a high luminance is in close proximity to the part of the scanning line having a higher luminance, so that the part of the scanning line having a high luminance enters a level higher than the original luminance level. As a result, the contour in the vertical direction of a reproduced image is emphasized.

The vertical velocity modulation apparatus may further comprises a parallel scanning circuit for outputting a parallel scanning signal for making forward and backward scanning lines formed on the screen by deflecting the electron beam back and forth parallel, and a synthesizing circuit for synthesizing the movement control signal produced by the movement control circuit and the parallel scanning signal outputted by the parallel scanning circuit, and the vertical velocity modulation coil may generate a magnetic field for modulating the scanning speed in the vertical direction of the electron beam on the basis of a signal synthesized by the synthesizing circuit.

In this case, a reproduced image having a high density is obtained by bidirectional scanning, and the contour of the image in the vertical direction is emphasized by modulating the scanning speed in the vertical direction. As a result, the quality of the reproduced image is increased.

The parallel scanning signal for making the forward and backward scanning lines in the bidirectional scanning parallel and the movement control signal for controlling the movement in the vertical direction of the scanning lines are synthesized, and the magnetic field for modulating the velocity in the vertical direction of the electron beam is generated by the vertical velocity modulation coil on the basis of the synthesized signal. Since the parallel scanning and the modulation of the scanning speed in the vertical direction are performed by the common vertical velocity modulation coil, so that the vertical velocity modulation apparatus is miniaturized and is reduced in cost.

The movement control circuit may output the distance of movement on the screen of a part of the scanning line to be an object as the movement control signal on the basis of the difference between the luminance of a part of the scanning line a predetermined number of horizontal scanning periods ahead of and the luminance of a part of the scanning line the predetermined number of horizontal scanning periods behind the part of the scanning line to be the object and the level of the luminance of the part of the scanning line to be the object.

In this case, the distance of movement on the screen of the part of the scanning line to be the object is set on the basis of the difference between the luminance of the part of the scanning line the predetermined number of scanning lines ahead of and the luminance of the part of the scanning line the predetermined number of scanning lines behind the part of the scanning line to be the object and the level of the luminance of the part of the scanning line to be the object. The part of the scanning line thus moves depending on the amount of the change in the luminance and the level of the luminance, so that the contour in the vertical direction of the reproduced image is emphasized.

The vertical velocity modulation apparatus may further comprise a frequency domain emphasis circuit for emphasizing a predetermined frequency domain of the movement control signal produced by the movement control circuit.

In this case, the predetermined frequency domain of the movement control signal is emphasized, and the scanning speed in the vertical direction of the electron beam is modulated on the basis of the emphasized movement control signal. Consequently, the scanning line sharply changes in a vertical edge and a horizontal edge of an image, so that the quality of the image is not degraded.

The frequency domain emphasis circuit may comprise an extraction circuit for extracting the predetermined frequency domain of the movement control signal produced by the movement control circuit, and an adder for adding the movement control signal produced by the movement control circuit and the signal in the frequency domain extracted by the extraction circuit.

In this case, the predetermined frequency domain of the movement control signal is extracted, and the movement control signal and the signal in the extracted frequency domain are added together. Consequently, the predetermined frequency domain of the movement control signal is emphasized.

A video display method according to still another aspect of the present invention comprises the steps of deflecting an electron beam in the horizontal direction and the vertical direction. to successively form scanning lines in the horizontal direction on a screen, and modulating the scanning speed in the vertical direction of the electron beam such that a part of the scanning line having a luminance which is not less than a predetermined value in a luminance change portion in the vertical direction moves farther apart from a part of the adjacent scanning line having a lower luminance than the predetermined value.

In this case, the part of the scanning line having a high luminance is shifted in the direction away from the part of the adjacent scanning line having a low luminance. Accordingly, the part of the scanning line having a low luminance is not easily affected by the part of the adjacent scanning line having a high luminance, so that the part of the scanning line having a low luminance enters the original low luminance level. Further, the part of the scanning line having a high luminance is in close proximity to the part of the scanning line having a higher luminance, so that the part of the scanning line having a high luminance enters a level higher than the original luminance level. As a result, the contour in the vertical direction of a reproduced image is emphasized.

The step of deflecting the electron beam may comprise the step of deflecting the electron beam back and forth in the horizontal direction, to form the forward and backward scanning lines on the screen.

In this case, the reproduced image having a high density is obtained by bidirectional scanning, and the contour of the image in the vertical direction is emphasized by modulating the scanning speed in the vertical direction. As a result, the quality of the reproduced image is increased.

The step of modulating the scanning speed may comprise the steps of outputting a parallel scanning signal for making the forward and backward scanning lines parallel, producing a movement control signal for controlling the movement in the vertical direction of the scanning line in a luminance change portion in the vertical direction on the basis of the luminance signal, synthesizing the parallel scanning signal and the movement control signal, and generating a magnetic field for modulating the scanning speed in the vertical direction of the electron beam on the basis of a synthesized signal.

In this case, the parallel scanning signal for making the forward and backward scanning lines parallel and the movement control signal for controlling the movement in the vertical direction of the scanning lines are synthesized, and the scanning speed in the vertical direction of the electron beam is modulated on the basis of the synthesized signal. Therefore, a common coil can be used for the parallel scanning and the modulation of the scanning speed in the vertical direction. Consequently, the apparatus is miniaturized and is reduced in cost.

The step of producing the movement control signal may comprise the steps of detecting the luminance change portion in the vertical direction on the basis of the luminance signal, outputting the distance of movement of the scanning line on the screen in the vertical direction in the luminance change portion as the movement control signal on the basis of the luminance signal, and reversing the time axis of the movement control signal in the backward scanning. Consequently, it is possible to modulate the scanning speed in the vertical direction in the bidirectional scanning.

The step of modulating the scanning speed may comprise the step of clamping the movement control signal to a predetermined potential at predetermined timing.

In this case, each of the scanning lines can be formed at a reference position previously determined, and the part of each of the scanning lines can be moved from the reference position in the luminance change portion in the vertical direction. Consequently, the image quality is prevented from being degraded by the shift of the scanning line.

The step of modulating the scanning speed may comprise the step of setting the distance of movement on the screen of the part of the scanning line to be the object on the basis of the difference between the luminance of the part of the scanning line the predetermined number of horizontal scanning periods ahead of and the luminance of the part of the scanning line the predetermined number of horizontal scanning periods behind the part of the scanning line to be the object and the level of the luminance of the part of the scanning line to be the object.

In this case, the distance of movement on the screen of the part of the scanning line to be the object is set on the basis of the difference between the luminance of the part of the scanning line the predetermined number of scanning lines ahead of and the luminance of the part of the scanning line the predetermined number of scanning lines behind the part of the scanning line to be the object and the level of the luminance of the part of the scanning line to be the object is set. The part of the scanning line thus moves depending on the amount of the change in the luminance and the level of the luminance, so that the contour in the vertical direction of the reproduced image is emphasized.

The step of modulating the scanning speed may comprise the steps of producing a movement control signal for controlling the movement in the vertical direction of the scanning lines on the basis of the luminance signal, emphasizing a predetermined frequency domain of the movement control signal, and generating a magnetic field for modulating the scanning speed in the vertical direction of the electron beam on the basis of the movement control signal.

In this case, the movement control signal for controlling the movement in the vertical direction of the scanning lines is produced on the basis of the luminance signal, the predetermined frequency domain of the produced movement control signal is emphasized, and the scanning speed in the vertical direction of the electron beam is modulated on the basis of the emphasized movement control signal. Consequently, the scanning line sharply changes in the vertical edge and the horizontal edge of the image, so that the quality of the image is not degraded.

According to the present invention, the scanning speed in the vertical direction is modulated such that the part of the scanning line having a high luminance moves farther apart from the part of the scanning line having a low luminance, so that the contour of the image in the vertical direction is emphasized. As a result, a sharp reproduced image is obtained.

Furthermore, the scanning speed in the vertical direction is modulated in the bidirectional scanning, so that the contour in the vertical direction is emphasized in the image having a high density. As a result, the quality of the reproduced image is increased.

Furthermore, the parallel scanning signal and the movement control signal are synthesized, so that the parallel scanning and the modulation of the scanning speed in the vertical direction are performed by the common vertical velocity modulation coil. As a result, the vertical velocity modulation apparatus and the video display apparatus are miniaturized and are reduced in cost.

Furthermore, by arranging the vertical velocity modulation coil in a position departing from the periphery of the metal case of the electron gun and around the CRT, or emphasizing the predetermined frequency domain of the movement control signal, the scanning line sharply changes in the vertical edge and the horizontal edge of the image, so that the quality of the image is not degraded.

BRIEF DESCRIPTION OF THE DRAWINGS

FIG. 10 is a diagram showing a first example of a movement distance conversion table;

FIG. 11 is a diagram showing a second example of a movement distance conversion table;

FIG. 12 is a diagram showing a third example of a movement distance conversion table;

FIG. 13 is a diagram showing a fourth example of a movement distance conversion table;

FIG. 20 is a diagram showing an example of singular point detection;

FIG. 21 is a diagram showing the logic of a signal in each portion in the singular point detection circuit shown in FIG. 19;

FIG. 33 is a diagram showing the luminance distribution in the vertical direction in conventional vertical contour correction, and a diagram showing the movement of scanning lines in the conventional vertical contour correction.

BEST MODE FOR CARRYING OUT THE INVENTION

Figure 1:
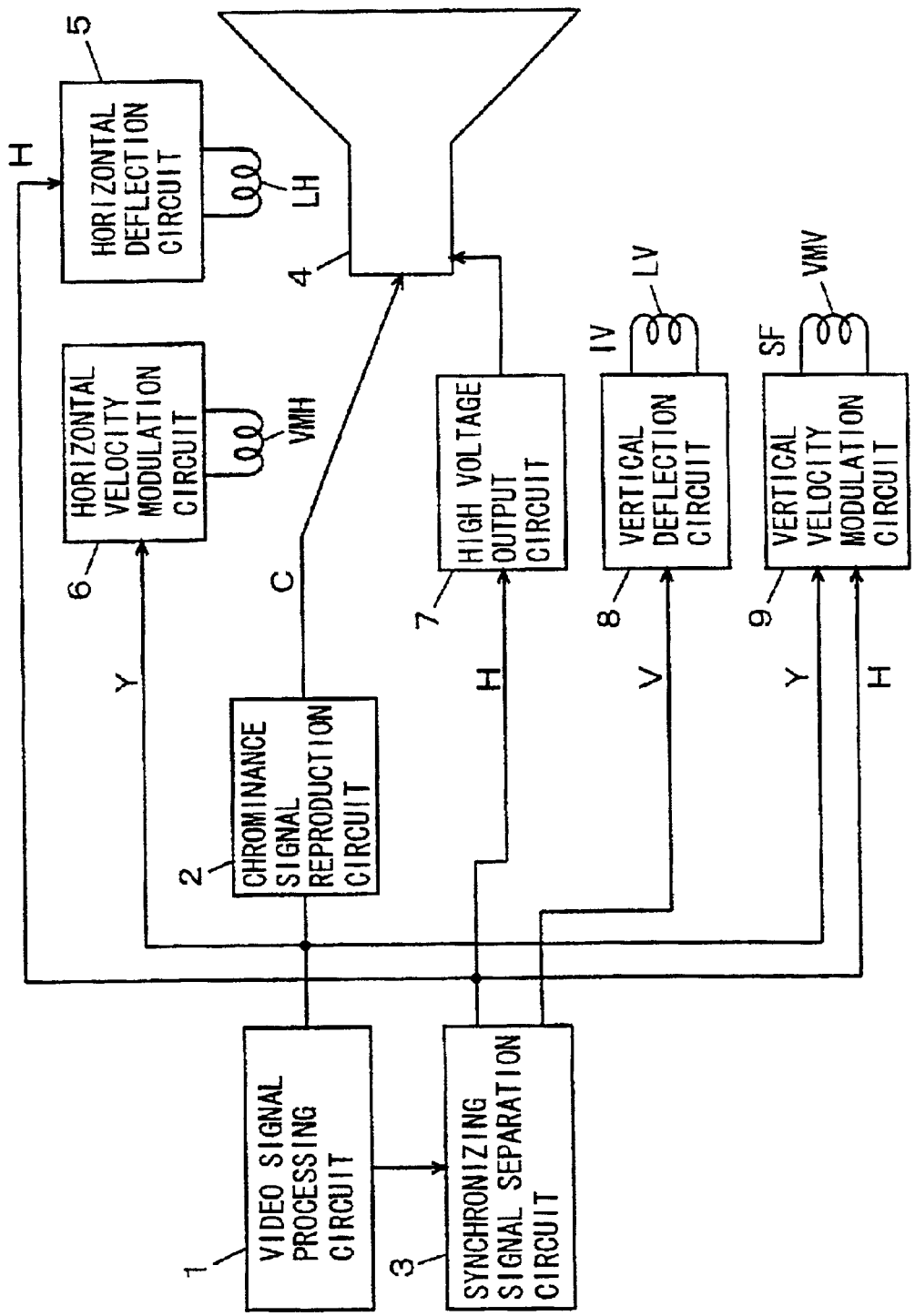
FIG. 1 is a block diagram showing the configuration of a video display apparatus according to one embodiment of the present invention.

FIG. 1 is a block diagram showing the overall configuration of a video display apparatus according to one embodiment of the present invention.

The video display apparatus shown in FIG. 1 comprises a video signal processing circuit 1, a chrominance signal reproduction circuit 2, a synchronizing signal separation circuit 3, a cathode ray tube (CRT) 4, a horizontal deflection circuit 5, a horizontal velocity modulation circuit 6, a high voltage output circuit 7, a vertical deflection circuit 8, and a vertical velocity modulation circuit 9. A horizontal deflection coil LH, a horizontal velocity modulation coil VMH, a vertical deflection coil LV, and a vertical velocity modulation coil VMV are mounted on the cathode ray tube 4.

The video signal processing circuit 1 separates a luminance signal and a color difference signal from a video signal and outputs the signals, and feeds the video signal to the synchronizing signal separation circuit 3. The chrominance signal reproduction circuit 2 reproduces a chrominance signal from the luminance signal and the color difference signal which are outputted from the video signal processing circuit 1, and feeds the chrominance signal as a display signal C to the cathode ray tube 4. The synchronizing signal separating circuit 3 extracts a horizontal synchronizing signal H and a vertical synchronizing signal V from the video signal fed from the video signal processing circuit 1.

The horizontal deflection circuit 5 comprises a horizontal driving circuit, a horizontal output circuit, a distortion correction circuit, a linearity correction circuit, and an S shaped correction capacitor. The horizontal deflection circuit 5 feeds a saw tooth horizontal deflection signal (a horizontal deflecting current) to the horizontal deflection coil LH in order to deflect an electron beam in the horizontal direction in the cathode ray tube 4 in synchronization with a horizontal synchronizing signal H outputted from the image signal processing circuit 1.

The horizontal velocity modulation circuit 6 comprises a pre-driving circuit, a horizontal velocity modulation driving circuit, and so forth, and feeds, on the basis of a luminance signal Y outputted from the video signal processing circuit 1, a horizontal velocity modulation signal (a horizontal velocity modulating current) for modulating the velocity of the electron beam in the horizontal direction in the cathode ray tube 4 to the horizontal velocity modulation coil VMH, to make horizontal contour correction.

The high voltage output circuit 7 comprises a high voltage driving circuit, a flyback transformer, a dynamic automatic focusing control circuit, and a dynamic automatic focusing output circuit, and applies a high voltage to the cathode ray tube 4 in order to carry out focusing control, for example.

The vertical deflection circuit 8 comprises a vertical output circuit, and feeds a saw tooth vertical deflection signal (a vertical deflecting current) to the vertical deflection coil LV in order to deflect the electron beam in the vertical direction in the cathode ray tube 4 in synchronization with the horizontal synchronizing signal H and the vertical synchronizing signal V which are outputted from the video signal processing circuit 1.

The vertical velocity modulation circuit 9 has a configuration shown in FIG. 5 described later, and feeds a vertical velocity modulation signal (a vertical velocity modulating current) SF for modulating the velocity of the electron beam in the vertical direction in the cathode ray tube 4 to the vertical velocity modulation coil VMV on the basis of the luminance signal Y and the horizontal synchronizing signal H which are outputted from the video signal processing circuit 1, to make vertical contour correction.

Figure 2:
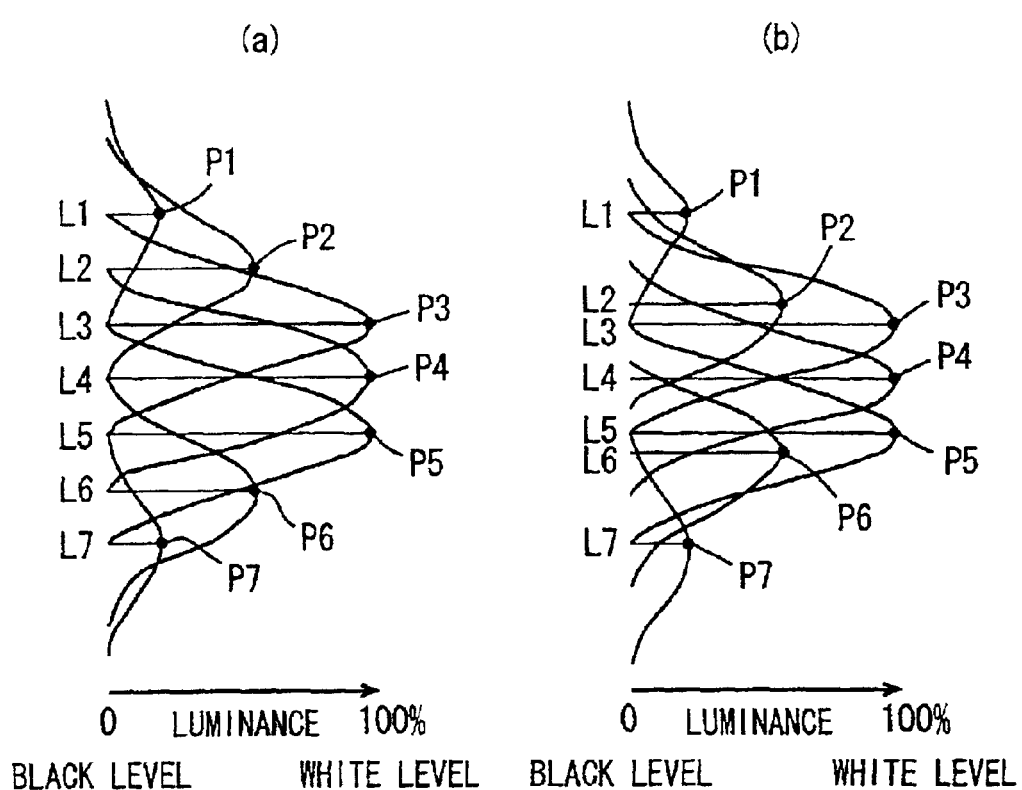
FIG. 2 is a diagram showing an example of luminance distribution in the vertical direction before vertical contour correction, and a diagram showing an example of luminance distribution in the vertical direction after vertical contour correction.
Figure 3:
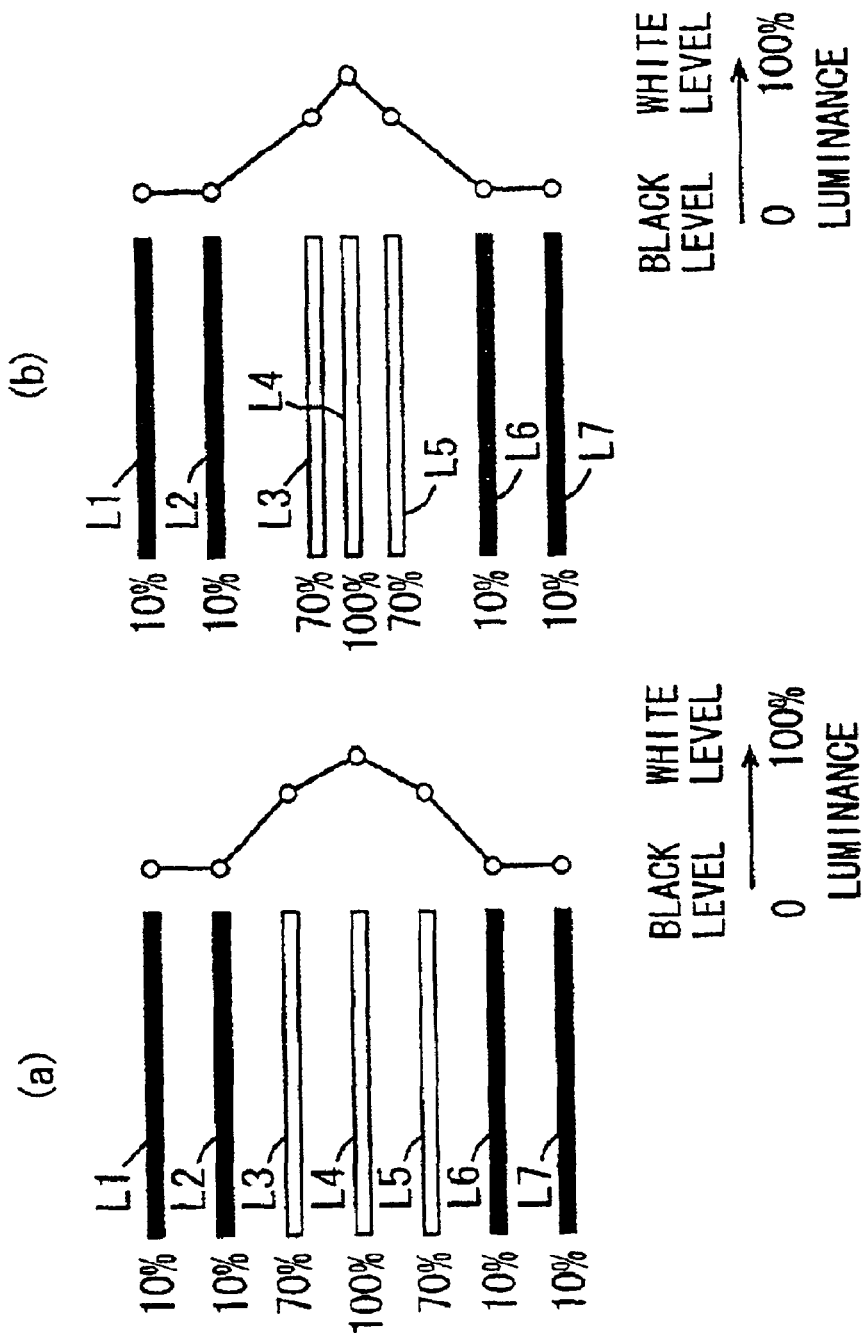
FIG. 3 is a diagram showing an example of scanning lines and luminance distribution before vertical contour correction, and a diagram showing an example of scanning lines and luminance distribution after vertical contour correction.

The video display apparatus according to the present embodiment performs bidirectional scanning and performs modulation of the scanning speed in the vertical direction (hereinafter referred to as vertical velocity modulation). Referring now to FIGS. 2 and 3, description is made of vertical contour correction by the vertical velocity modulation performed in the video display apparatus according to the present embodiment.

FIG. 2(a) is a diagram showing an example of luminance distribution in the vertical direction before the vertical contour correction, and FIG. 2(b) is a diagram showing an example of luminance distribution in the vertical direction after the vertical contour correction. The respective original luminances of scanning lines L1 to L7 are indicated by p1 to p7. The luminances p1 and p7 of the scanning lines L1 and L7 are low, the luminances p2 and p6 of the scanning lines L2 and L6 are slightly high, and the luminances p3, p4, and p5 of the scanning lines L3, L4, and L5 are highest.

As shown in FIG. 2(a), when the intervals among the scanning lines L1 to L7 are equal, the scanning lines L1 and L7 having the low luminance are affected by the respective adjacent scanning lines L2 and L6 having the high luminance. Consequently, the luminances of the scanning lines L1 and L7 are higher than the original luminances p1 and p7, so that the scanning lines L1 and L7 look whiter than a color of the original luminances. As a result, the contour in the vertical direction of a reproduced image looks blurred.

As shown in FIG. 2(b), the scanning lines L2 and L6 having the high luminance are shifted in the direction away from the respective adjacent scanning lines L1 and L7 having the low luminance. Consequently, the scanning lines L1 and L7 having the low luminance are not easily affected by the respective adjacent scanning lines L2 and L6 having the high luminance, so that the luminances of the scanning liens L1 and L7 enter their original low level. Further, the scanning lines L2 and L6 having the high luminance are in closer proximity to the scanning lines having the higher luminance. Consequently, the luminances of the scanning lines L2 and L6 enter a level higher than that of the original luminances p2 and P6, to approach a white level. As a result, the contour in the vertical direction of the reproduced image is emphasized.

FIG. 3(a) is a diagram showing scanning lines before the vertical contour correction and an example of the luminance distribution, and FIG. 3(b) is a diagram showing scanning lines after the vertical contour correction and an example of the luminance distribution.

In FIGS. 3(a) and 3(b), the luminance of the scanning lines L1, L2, L6 and L7 is taken as 10%, the luminance of the scanning lines L3 and L5 is taken as 70%, and the luminance of the scanning line L4 is taken as 100%.

As shown in FIG. 3(a), the scanning liens L3 and L5 having the luminance of 70% are respectively adjacent to the scanning lines L2 and L6 having the luminance of 10%. In this case, as shown in FIG. 3(b), the scanning lines L3 and L5 having the high luminance are respectively moved farther apart from the scanning lines L2 and L6 having the low luminance. Consequently, the scanning lines L2 and L6 having the low luminance are not easily affected by the scanning lines L3 and L5 having the high luminance.

By thus moving the bright scanning line farther apart from the dark scanning line, the originally dark scanning line looks darker, and the originally bright scanning line looks brighter. As a result, the contour in the vertical direction of the image is emphasized.

Figure 4:
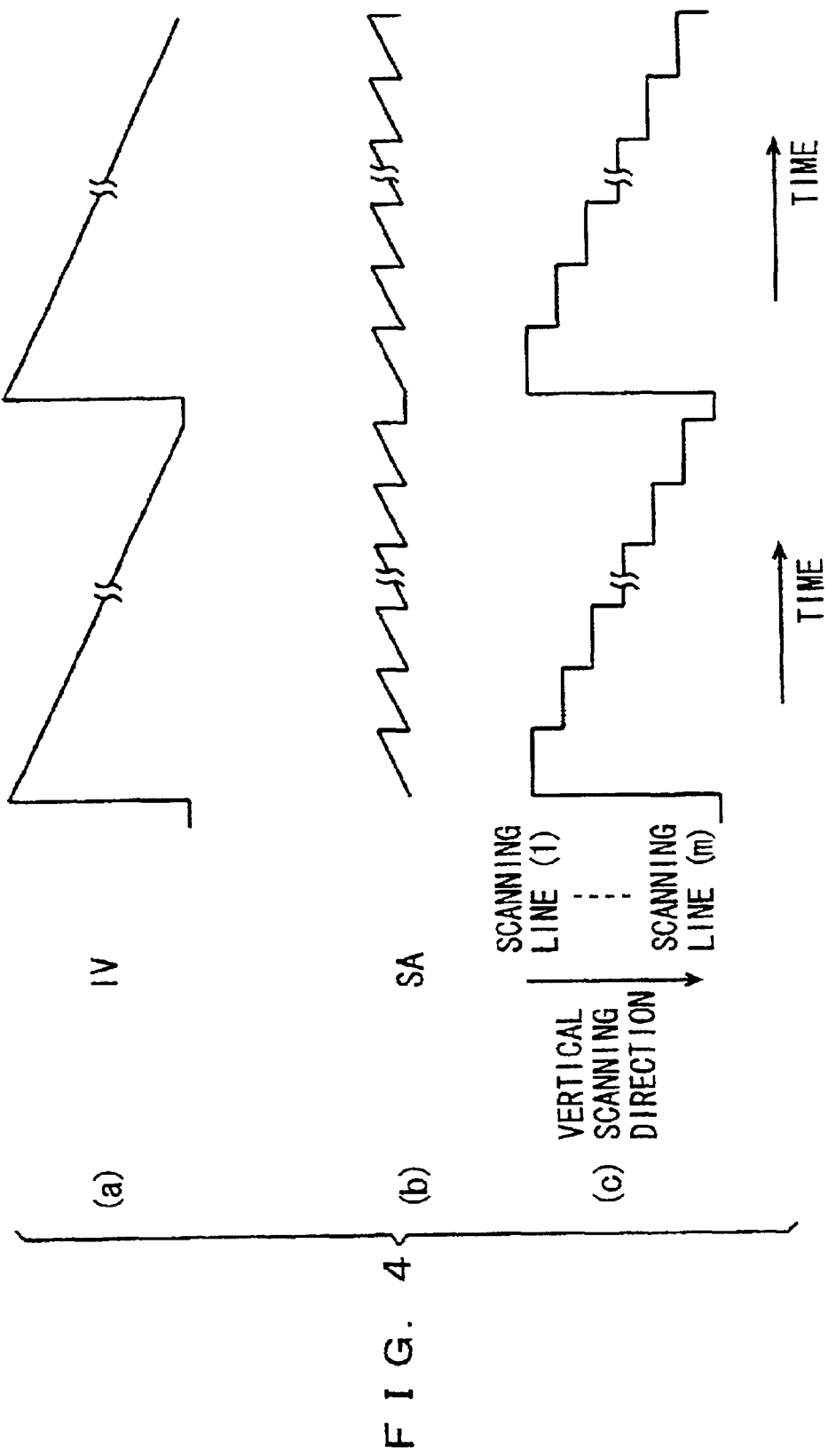
FIG. 4 is a waveform diagram of a vertical deflection signal outputted from a vertical deflection circuit, a waveform diagram of a parallel scanning signal outputted from a parallel scanning circuit, and a diagram showing parallel scanning based on a vertical deflection signal and a parallel scanning signal.

In bidirectional scanning, the scanning lines must be scanned in directions parallel to each other on a screen. Referring to FIG. 4, description is made of parallel scanning. In the following description, forward scanning and backward scanning in the bidirectional scanning are respectively referred to as trace and retrace.

FIG. 4(a) is a waveform diagram of a vertical deflection signal IV outputted from the vertical deflection circuit 8 shown in FIG. 1, FIG. 4(b) is a waveform diagram of a parallel scanning signal SA outputted from a parallel scanning circuit 11 described later, and FIG. 4(c) is a diagram showing parallel scanning based on the vertical deflection signal IV and the parallel scanning signal SA. In FIG. 4(c), the number of scanning lines is taken as m.

The period of the vertical deflection signal IV shown in FIG. 4(a) is equal to the period of the vertical synchronizing signal V, and the period of the parallel scanning signal SA shown in FIG. 4(b) is equal to the period of the horizontal synchronizing signal H. An electron beam is deflected downward from the top in a step shape for each horizontal scanning period in one vertical scanning period by the vertical deflection signal IV and the parallel scanning signal SA, and is deflected rightward from the left or leftward from the right by the horizontal deflection signal outputted from the horizontal deflection circuit 5 shown in FIG. 1. Consequently, the parallel scanning of the electron beam on the screen is performed, as shown in FIG. 4(c).

Figure 5:
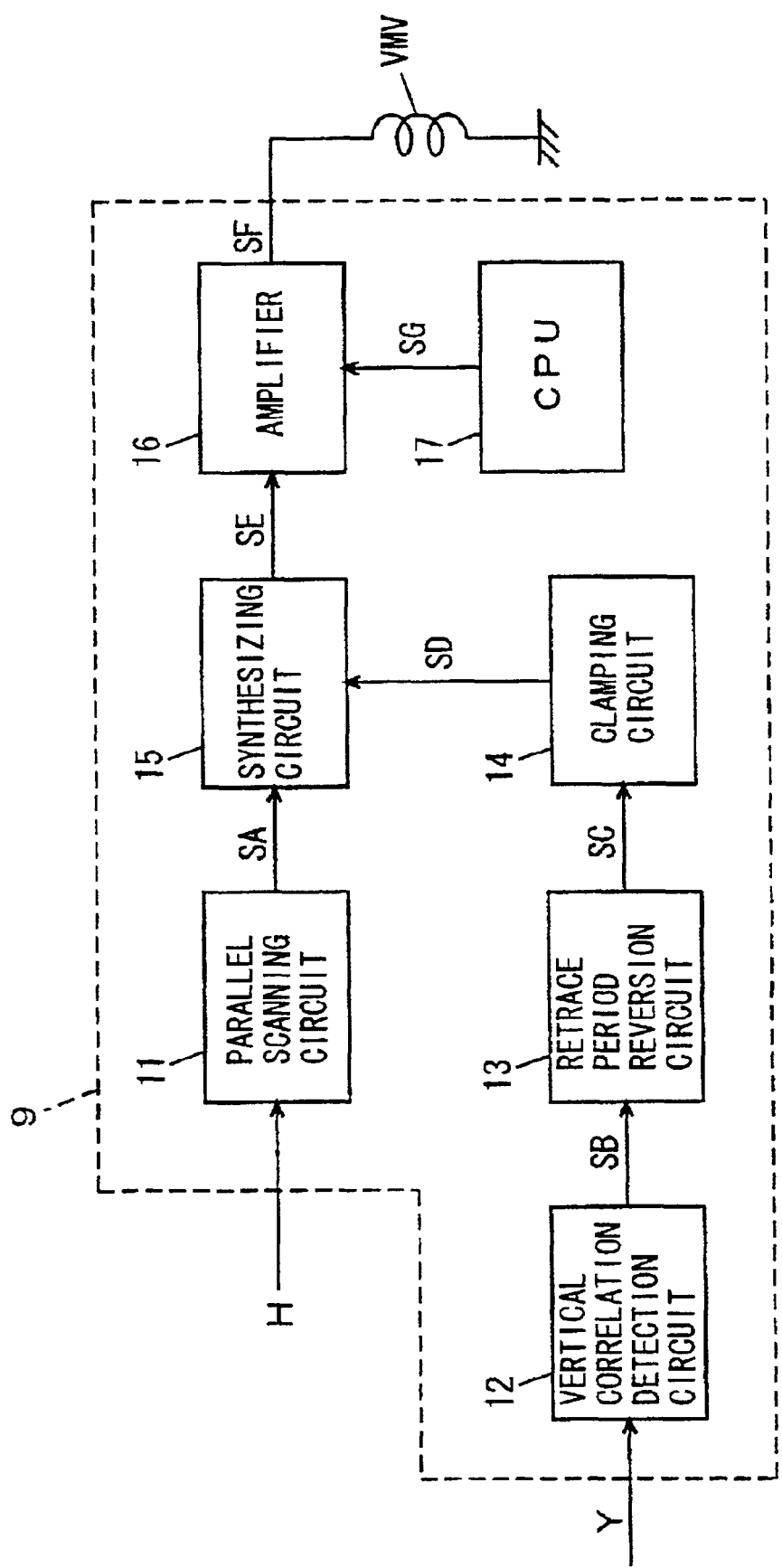
FIG. 5 is a block diagram showing the configuration of the vertical velocity modulation circuit shown in FIG. 1.

FIG. 5 is a block diagram showing the configuration of the vertical velocity modulation circuit 9 shown in FIG. 1. FIG. 6(a) is a diagram showing an example of scanning lines before the vertical contour correction, and FIG. 6(b) is a diagram showing an example of scanning lines after the vertical contour correction. Further, FIG. 7 is a signal waveform diagram showing the operation of the vertical velocity modulation circuit 9 shown in FIG. 5.

In FIG. 5, the vertical velocity modulation circuit 9 comprises a parallel scanning circuit 11, a vertical correlation detection circuit 12, a retrace period reversion circuit 13, a clamping circuit 14, a synthesizing circuit 15, an amplifier 16, and a CPU (Central Processing Unit) 17. A gain control signal SG is fed from the CPU 17 to the amplifier 16.

In the present embodiment, the horizontal deflection circuit 5 and the horizontal deflection coil LH correspond to horizontal deflection means, the vertical deflection circuit 8 and the vertical deflection coil LV correspond to vertical deflection means, and the vertical velocity modulation circuit 9 and the vertical velocity modulation coil VMV correspond to vertical velocity modulation means. Further, the parallel scanning circuit 11 corresponds to parallel scanning means, the vertical correlation detection circuit 12, the retrace period reversion circuit 13, and the clamping circuit 14 constitute movement control means, and the synthesizing circuit 15 corresponds to synthesis means. Further, the clamping circuit 14 corresponds to clamping means, and the CPU 17 corresponds to gain control means.

Figure 6:
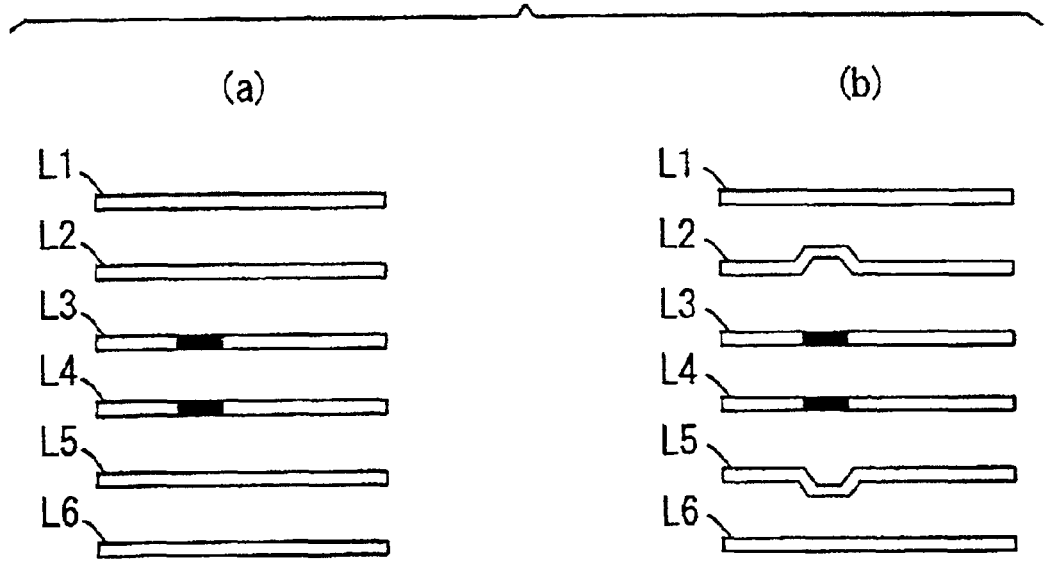
FIG. 6 is a diagram showing an example of scanning lines before vertical contour correction, and a diagram showing an example of scanning lines after vertical contour correction.
Figure 7:
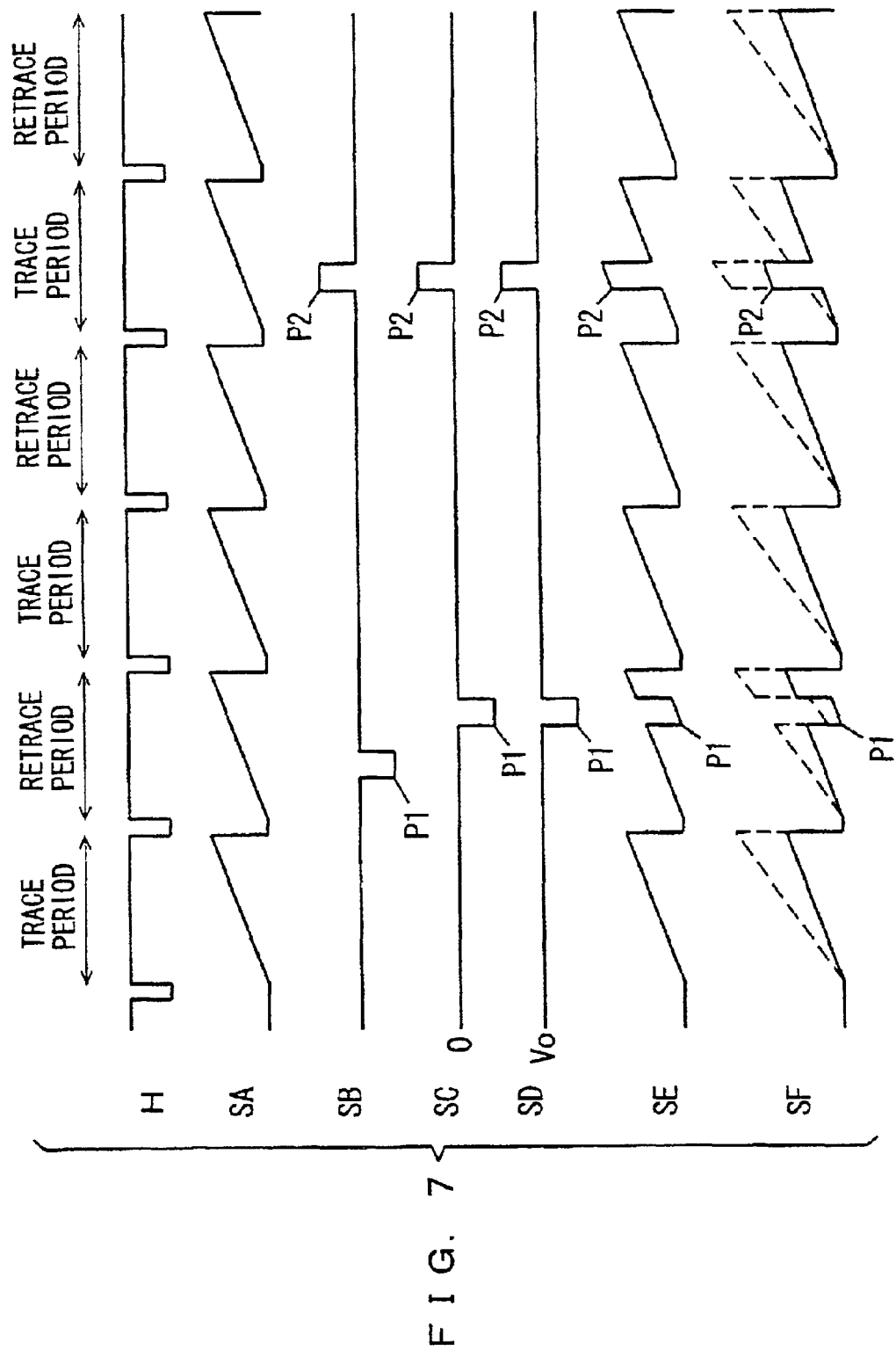
FIG. 7 is a signal waveform diagram showing the operation of a vertical velocity modulation circuit.

Referring now to the signal waveform diagram of FIG. 7, description is made of the operation of the vertical velocity modulation circuit shown in FIG. 5. Here, a case where the reproduced image shown in FIG. 6 is displayed will be described.

Although a signal is actually delayed for each horizontal scanning period, respectively, in the vertical correlation detection circuit 12 and the retrace period reversion circuit 13, described later, the delay of the signal is not considered in order to make conceptual understanding of the present embodiment easy in the signal waveform diagram of FIG. 7.

As shown in FIG. 6(a), the luminances of the scanning lines L1, L2, L5, and L6 are high, and the luminance of a part of each of the scanning lines L3 and L4 is low. In this case, as shown in FIG. 6(b), a part of the scanning line L2 adjacent to a low luminescent part of the scanning line L3 is shifted in the direction away from the scanning line L3. A part of the scanning line L5 adjacent to a low luminance part of the scanning line L4 is shifted in the direction away from the scanning line L4.

The parallel scanning circuit 11 shown in FIG. 5 outputs a saw tooth parallel scanning signal SA in synchronization with the horizontal synchronizing signal H. The vertical correlation detection circuit 12 detects a portion where the change in the luminance in the vertical direction exceeds a predetermined value on the basis of the luminance signal Y, and outputs a movement control signal SB representing the distance of movement on the screen of the scanning line.

In this example, a pulse P1 representing a negative distance of movement on the screen and a pulse P2 representing a positive distance of movement on the screen appear in the movement control signal SB. In this case, the scanning line is shifted upward at a point of the pulse P1. and the scanning line is shifted downward at a point of the pulse P2.

The retrace period reversion circuit 13 outputs the movement control signal SB outputted from the vertical correlation detection circuit 12 as it is in a trace period, reverses the time axis of the movement control signal SB outputted from the vertical correlation detection circuit 12 in a retrace period, and outputs an obtained signal as a movement control signal SC. The movement control signal SC changes such that the average voltage level is zero.

The clamping circuit 14 clamps the movement control signal SC outputted from the retrace period reversion circuit 13 to a predetermined DC voltage $V_0$ at the timing of the horizontal synchronizing signal H, and outputs the clamped movement control signal SD.

The synthesizing circuit 15 synthesizes the parallel scanning signal SA outputted from the parallel scanning circuit 11 and the movement control signal SD outputted from the clamping circuit 14, and outputs a synthesized signal as a vertical velocity modulation signal SE.

The amplifier 16 amplifies the vertical velocity modulation signal SE outputted from the synthesizing circuit 15 by gain set by the gain control signal SG, and drives the vertical velocity modulation coil VMV by the amplified vertical velocity modulation signal SF.

Figure 8:
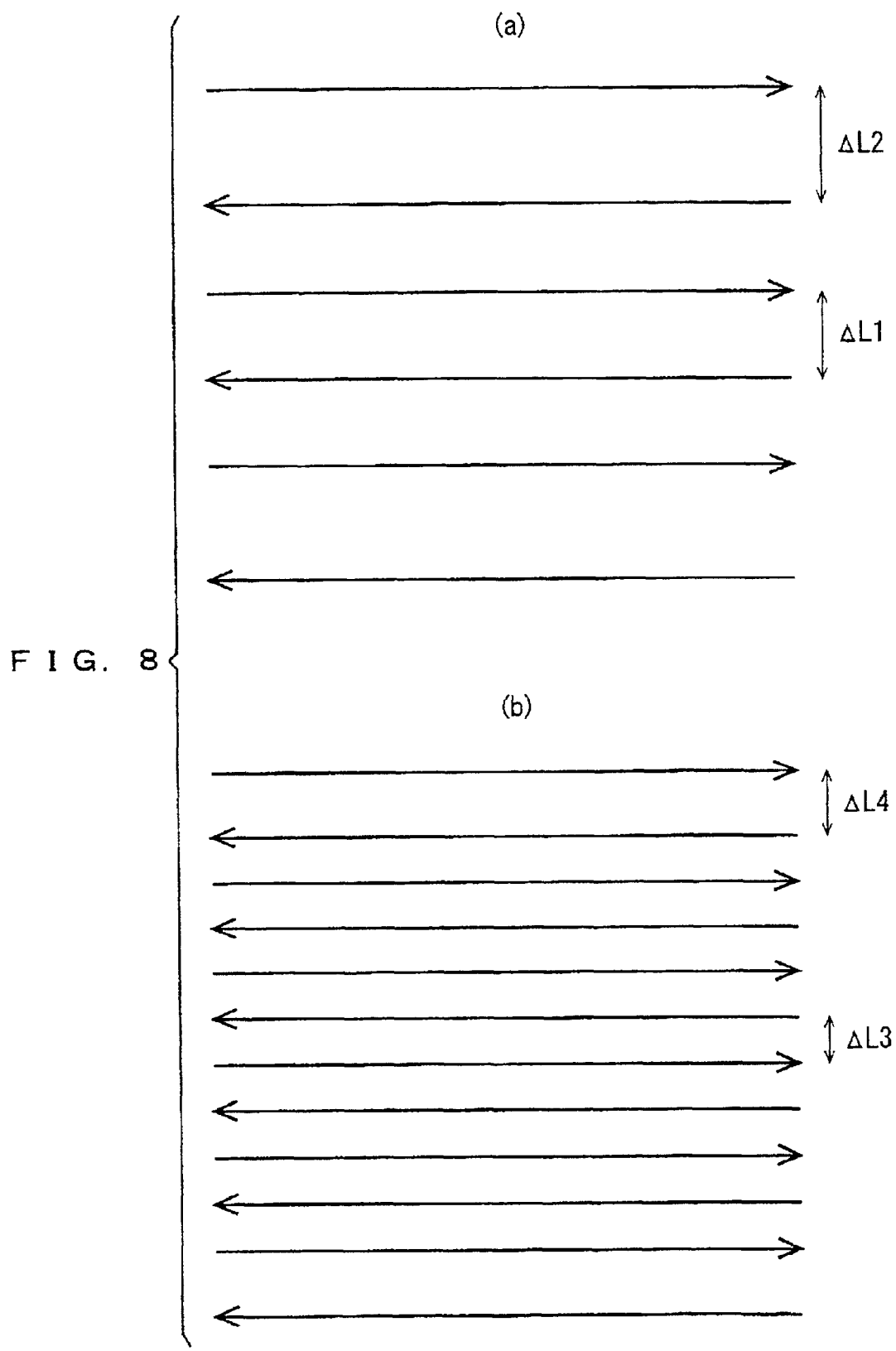
FIG. 8 is a diagram showing one example of bidirectional progressive scanning, and a diagram showing another example of bidirectional progressive scanning.

The gain of the amplifier 16 can be controlled by the gain control signal SG. Consequently, the intervals among the scanning lines can be adjusted, as shown in FIG. 8. FIGS. 8(a) and 8(b) are diagrams respectively showing bidirectional progressive scanning of different numbers of scanning lines.

In the bidirectional progressive scanning shown in FIG. 8(b), the number of scanning lines is two, and the interval between the scanning lines is one-half, as compared with that in the bidirectional progressive scanning shown in FIG. 8(a).

For example, the gain of the amplifier 16 is set to two in the case of bidirectional progressive scanning of 525 scanning lines, while being set to one in the case of bidirectional progressive scanning of 1050 scanning lines. in FIG. 7, the waveform of the vertical velocity modulation signal SF in a case where the gain is two Is indicated by a broken line, and the waveform of the vertical velocity modulation signal SF in a case where the gain is one is indicated by a solid line.

By controlling the gain of the amplifier 16, intervals $\Delta L2$ and $\Delta L4$ among scanning lines in an upper part and a lower part of a screen can be set to values larger than intervals $\Delta L1$ and $\Delta L3$ among scanning lines at the center of the screen, as shown in FIGS. 8(a) and 8(b). Consequently, it is possible to correct the effect of curved shapes in an upper part and a lower part of the surface of the cathode ray tube 4 shown in FIG. 1. In this case, the distance of movement on the screen of the scanning line by vertical velocity modulation in the upper part and the lower part of the screen is larger than the distance of movement on the screen of the scanning line by vertical velocity modulation at the center of the screen.

Figure 9:
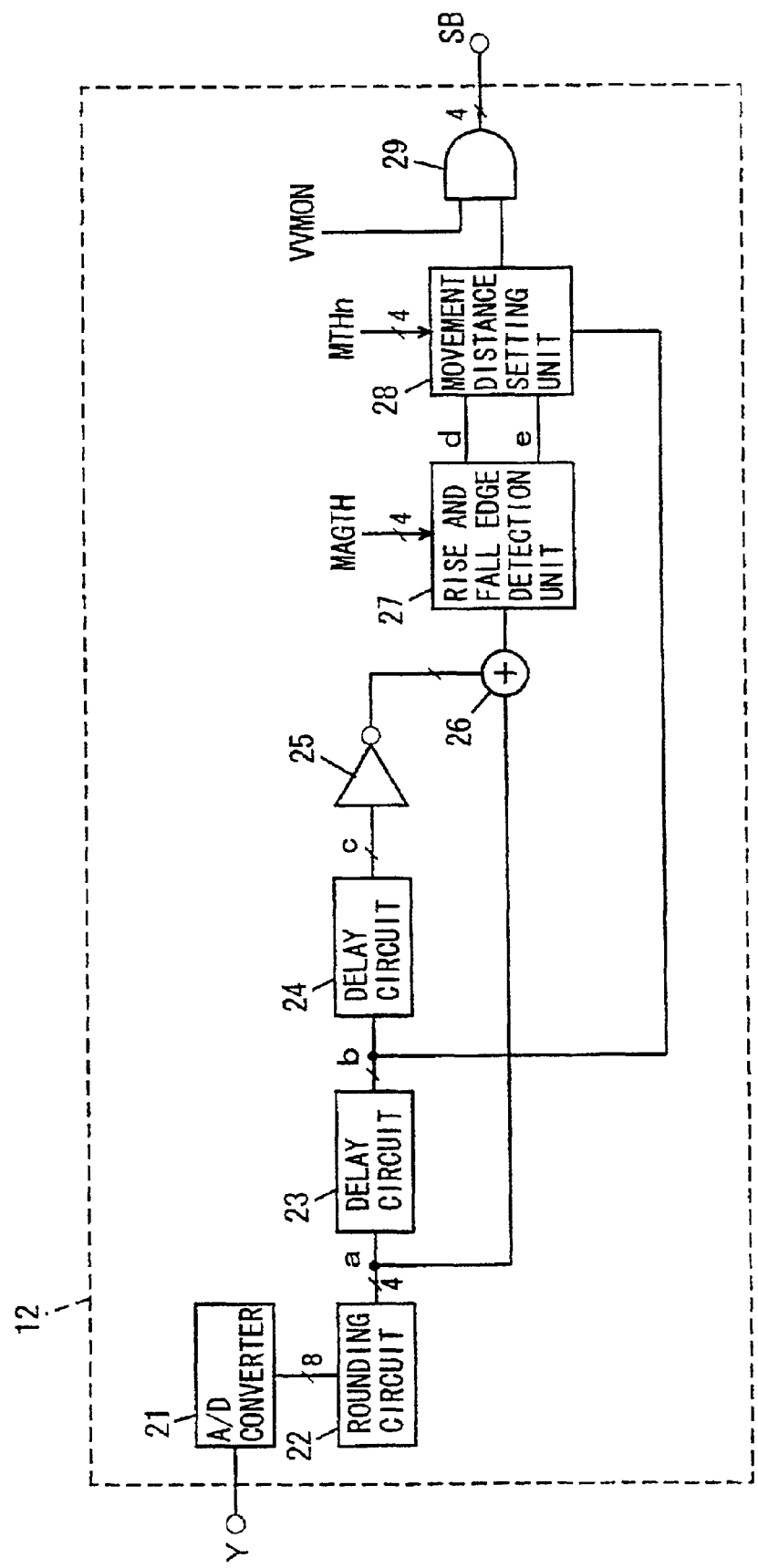
FIG. 9 is a block diagram showing the configuration of a vertical correlation detection circuit shown in FIG. 5.

FIG. 9 is a block diagram showing the configuration of the vertical correlation detection circuit 12 shown in FIG. 5.

In FIG. 9, the vertical correlation detection circuit 12 comprises an A/D (Analog-to-Digital) converter 21, a rounding circuit 22, delay circuits 23 and 24, an inverter 25, an adder 26, a rise and fall edge detection unit 27, a movement distance setting unit 28, and an AND gate 29.

The A/D converter 21 converts the luminance signal Y fed from the video signal processing circuit 1 shown in FIG. 1 into a 8-bit digital signal. The digital signal is represented by a binary number with no sign. The rounding circuit 22 subjects the 8-bit digital signal outputted from the A/D converter 21 to rounding processing, to output a 4-bit digital signal a.

The delay circuit 23 delays the digital signal a outputted from the rounding circuit 22 by one horizontal scanning period, to output a delayed 4-bit digital signal b. The delay circuit 24 delays the digital signal b outputted from the delay circuit 23 by one horizontal scanning period, to output a delayed 4-bit digital signal c.

The inverter 25 inverts the digital signal c outputted from the delay circuit 24. The adder 26 adds the digital signal a outputted from the rounding circuit 22 and the digital signal outputted from the inverter 25 together. Consequently, the result of subtraction (a−c) of the digital signal c from the digital signal a is obtained. The result of the subtraction (a−c) of the digital signal c from the digital signal a is represented by a two's complement. That is, the result of the subtraction (a−c) represents a negative number when the MSB (Most Significant Bit) thereof is "1", while representing a positive number when it is "0". The result of the subtraction (a−c) is given to the rise and fall edge detection unit 27.

A 4-bit threshold value MAGTH is previously given from the CPU 17 shown in FIG. 5 to the rise and fall edge detection unit 27. The rise and fall edge detection unit 27 outputs an edge presence or absence signal e and a rise and fall edge judgment signal d on the basis of the result of the subtraction (a−c) given from the adder 26. A change point from a low luminance to a high luminance in the vertical direction is referred to as an upper edge, and a change point from a high luminance to a low luminance is referred to as a lower edge.

The rise and fall edge detection unit 27 judges that there is an upper edge when the MSB of the result of the subtraction (a−c) is "0", that is, a−c≧0, to set the rise and fall edge judgment signal d to "1". On the other hand, the rise and fall edge detection unit 27 judges that there is a lower edge when the MSB of the result of the subtraction (a−c) is "1", that is, a−c<0, to set the rise and fall edge judgment signal d to "0". Further, the rise and fall edge detection unit 27 judges that there is an upper edge or a lower edge when the result of the subtraction (a−c) is other than zero, to set the edge presence or absence signal e to "1", while judging that there is no upper edge and lower edge when the result of the subtraction (a−c) is zero, to set the edge presence or absence signal e to "0".

A movement distance conversion table is set by eight 4-bit constants MTHn previously given from the CPU 17 in the rmovement distance setting unit 28, where n=0, 1, 2, 3, 4, 5, 6, and 7. The movement distance setting unit 28 determines the distance of movement on the screen on the basis of the digital signal b outputted from the delay circuit 23, the edge presence or absence signal e and the rise and fall edge judgment signal d which are outputted from the rise and fall edge detection unit 27, and the movement distance conversion table.

FIG. 10 is a diagram showing a first example of the movement distance conversion table. In the example shown in FIG. 10, the amounts of movement "0000", "0001", "0010", "0011", "0100", "0101", "0110", and "0111" are respectively set at constants MTH0, MTH1, MTH2, MTH3, MTH4, MTH5, MTH6, and MTH7.

The movement distance setting unit 28 selects the distance of movement on the screen set at the constant MTHn having a value of n which coincides with the value of the digital signal b. For example, when the value of the digital signal b is four, the distance of movement on the screen "0100" (=4) set at the constant MTH4 is selected.

The movement distance setting unit 28 outputs the selected distance of movement on the screen as it is when the rise and fall edge judgment signal d is "0", while converting the distance of movement on the screen to a negative value and outputting the negative value when the rise and fall edge judgment signal d is "1". The movement distance setting unit 28 converts the selected distance of movement on the screen into zero and outputs the zero when the edge presence or absence signal e is "1". That is, when there is no upper edge or lower edge, the distance of movement on the screen of the scanning line is zero.

The distance of movement on the screen outputted from the movement distance setting unit 28 is given to one input terminal of the AND gate 29, while a vertical velocity modulation on-off signal VVMON is fed to the other input terminal thereof. When the vertical velocity modulation on-off signal VVMON is "1", vertical velocity modulation is on. In this case, the AND gate 29 outputs the distance of movement on the screen given from the movement distance setting unit 28. On the other hand, when the vertical velocity modulation on-off signal VVMON is "0", vertical velocity modulation is off. In this case, an output signal of the AND gate 29 is "0". The output signal of the AND gate 29 is fed to the retrace period reversion circuit 13 shown in FIG. 5 as the movement control signal SB.

The movement distance conversion table set in the movement distance setting unit 28 can be arbitrarily altered by the CPU 17.

FIG. 11 is a diagram showing a second example of the movement distance conversion table. In the example shown in FIG. 11, the distance of movement on the screen "0000" is set at constants MTH0, MTH1, and MTH2. Further, the distances of movement "0011", "0100", "0101", "0110", and "0111" are respectively set at constants MTH3, MTH4, MTH5, MTH6, and MTH7. In this case, when the value of the digital signal b is not more than two, the distance of movement on the screen of the scanning line is zero. That is, the scanning line whose luminance is not more than a predetermined level is not shifted.

FIG. 12 is a diagram showing a third example of the movement distance conversion table. In the example shown in FIG. 12, the distance of movement on the screen "0000" is set at constants MTH0, MTH1, MTH2, and MTH3, and the distance of movement on the screen "0111" is set at constants MTH4, MTH5, MTH6, and MTH7. In this case, the scanning lines whose luminances are not less than a predetermined level are uniformly shifted by the same distance of movement on the screen.

FIG. 13 is a diagram showing a fourth example of the movement distance conversion table. In the example shown in FIG. 13, the distance of movement on the screen "0000" is set at constants MTH0, MTH1, and MTH2, and the amounts of movement "0001", "0010", "0011", "0100", and "0101" are respectively set at constants MTH3, NTH4, MTH5, MTH6, and MTH7. In this case, coring processing for removing the effect of noise is performed.

Figure 14:
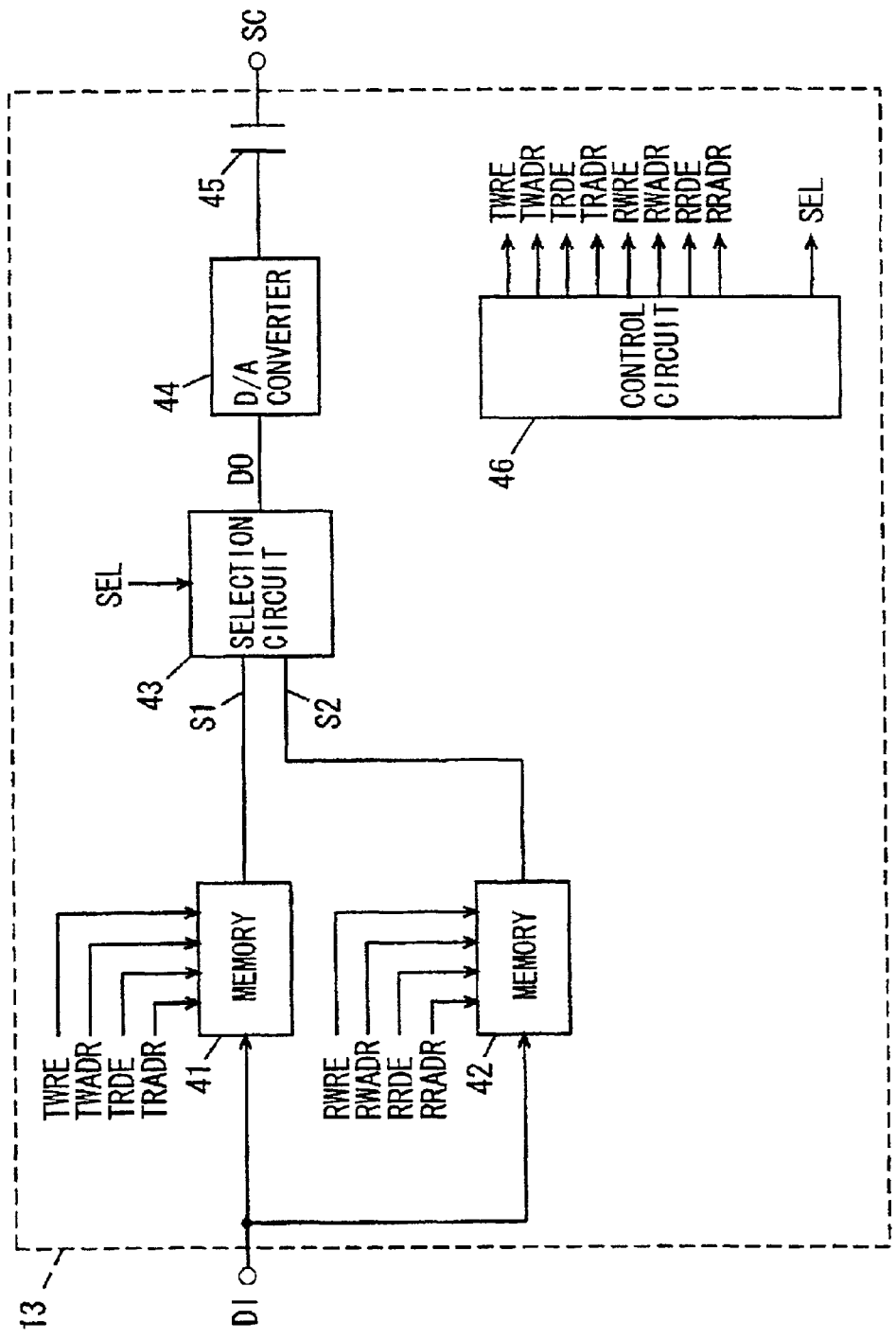
FIG. 14 is a block diagram showing the configuration of a retrace period reversion circuit.

FIG. 14 is a block diagram showing the configuration of the retrace period reversion circuit 13 shown in FIG. 5.

As shown in FIG. 14, the retrace period reversion circuit 13 comprises memories 41 and 42, a selection circuit 43, a D/A (Digital-to-Analog) converter 44, a capacitor 45, and a control circuit 46. The memory 41 is used for storing data in a trace period. The memory 42 is used for storing data in a retrace period.

The control circuit 46 generates a write enable signal TWRE, a write address signal TWADR, a read enable signal TRDE, a read address signal TRADR, a write enable signal RWRE, a write address signal RWADR, a read enable signal RRDE, a read address signal RRADR, and a selection signal SEL.

The write enable signal TWRE, the write address signal TWADR, the read enable signal TRDE, and the read address signal TRADR are fed to the memory 41. The write enable signal RWRE, the write address signal RWADR, the read enable signal RRDE, and the read address signal RRADR are fed to the memory 42. The selection signal SEL is fed to the selection circuit 43.

The movement control signal SB outputted from the vertical correlation detection circuit 12 shown in FIG. 9 is fed as input data DI to the memories 41 and 42. Data read out of the memories 41 and 42 are respectively fed to one input terminal S1 and the other input terminal 52 of the selection circuit 43.

The selection circuit 43 selects the data fed to the one input terminal S1 and the other input terminal S2 in response to the selection signal SEL, and feeds the selected data as output data DO to the D/A converter 44. The D/A converter 44 converts the data fed from the selection circuit 43 into an analog signal, and feeds the analog signal to one terminal of the capacitor 45. A movement control signal SC is outputted from the other terminal of the capacitor 45. A DC component of the output signal of the D/A converter 44 is removed by the capacitor 45. Consequently, the movement control signal SC changes such that the average voltage level is zero. The movement control signal SC is fed to the clamping circuit 14 shown in FIG. 5.

Although in the example shown in FIG. 9, the 8-bit digital signal outputted from the A/D converter 21 is converted into the 4-bit digital signal by the rounding circuit 22, the 8-bit digital signal outputted from the A/D converter 21 may be fed to the delay circuit 23 and the adder 26 without providing the rounding circuit 22. The number of bits composing each of the digital signals a, b, and c is not limited to four or eight. For example, the number of bits may be set to other numbers.

Figure 15:
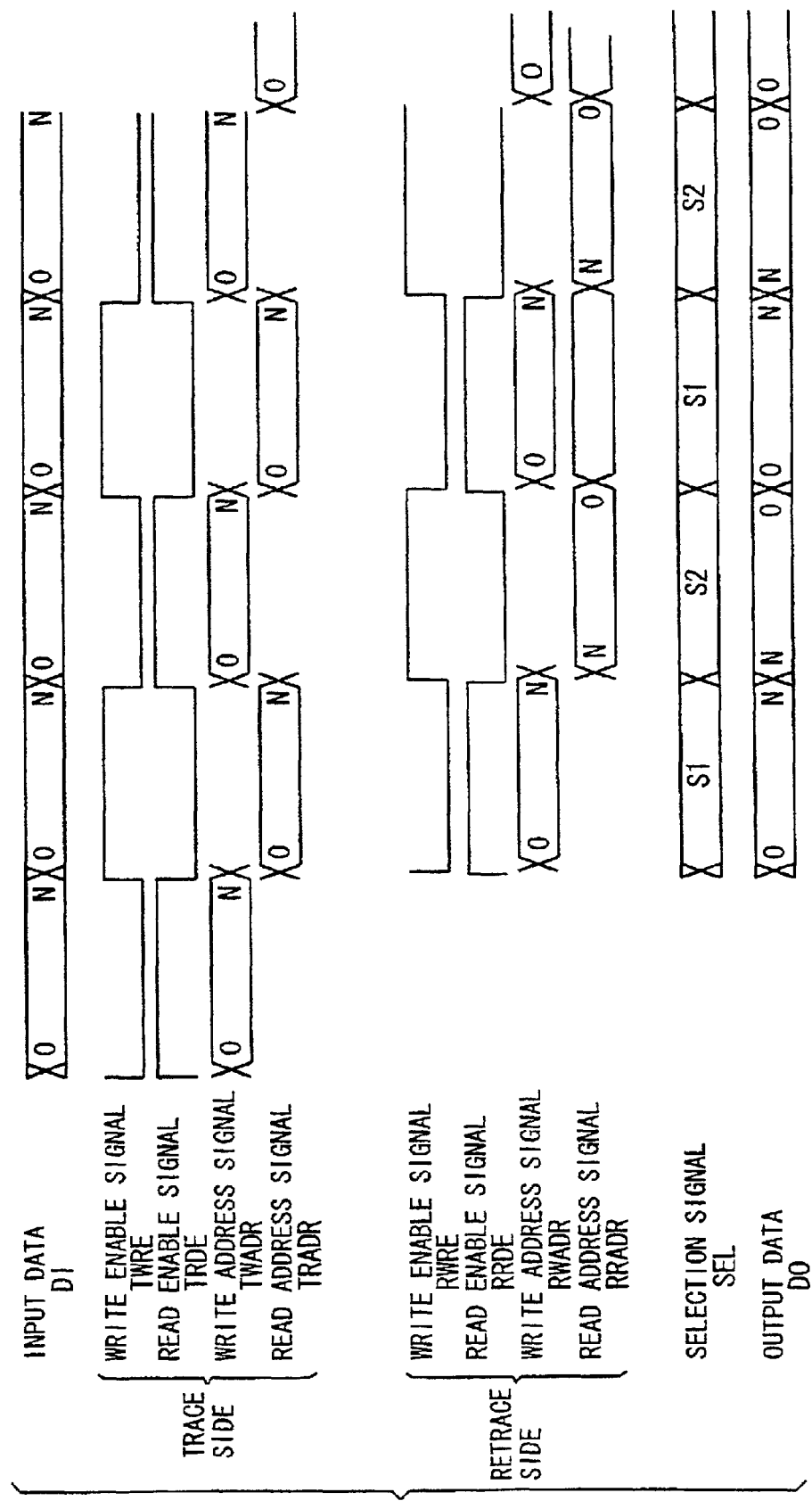
FIG. 15 is a timing chart showing the operation of the retrace period reversion circuit shown in FIG. 14.

FIG. 15 is a timing chart showing the operation of the retrace period reversion circuit 13 shown in FIG. 14.

The input data DI in one horizontal scanning period is represented by 0 to N. Addresses at which the input data 0 to N are stored in each of the memories 41 and 42 are similarly represented by 0 to N. The write enable signal TWRE, the read enable signal TRDE, the write enable signal RWRE, and the read enable signal RRDE represent an enable state when they are at a low level.

The write enable signal TWRE fed to the memory 41 first enters an enable state. At this time, the write address signal TWADR is fed to the addresses 0 to N in the memory 41 in this order. Consequently, the input data DI is written into the addresses 0 to N in the memory 41 in this order.

The read enable signal TRDE fed to the memory 41 then enters an enable state. At this time, the read address signal TRADR is fed to the addresses 0 to N in the memory 41 in this order. Consequently, the data is read out of the addresses 0 to N in the memory 41 in this order.

When the read enable signal TRDE fed to the memory 41 enters an enable state, the write enable signal RWRE fed to the memory 42 enters an enable state. At this time, the write address signal RWADR is fed to the addresses 0 to N in the memory 42 in this order. Consequently, the input data DI is written into the addresses 0 to N in the memory 42 in this order.

When the write enable signal TWRE fed to the memory 41 is in an enable state, the read enable signal RRDE fed to the memory 42 then enters an enable state. At this time, the read address signal RRADR is fed to the addresses N to 0 in the memory 42 in this order. Consequently, the data is read out of the addresses N to 0 in the memory 42 in this order.

The above-mentioned operations are alternately repeated. The selection circuit 43 selectively outputs as the output data DO fed to the input terminal Si at the time of a reading operation from the memory 41, and selectively outputs as the output data DO fed to the input terminal S2 at the time of a reading operation from the memory 42.

Consequently, data read out of the memory 41 in a trace period is the output data DO, and data read out of the memory 42 in a retrace period is the output data DO. In the memory 42, data is read out in the order reverse to the order in which the data is written, so that the output data DO whose time axis is reversed is obtained in the retrace period.

In the video display apparatus according to the present embodiment, a part of a scanning line having a high luminance is shifted in the direction away from a part of an adjacent scanning line having a low luminance in bidirectional progressive scanning. Therefore, the contour in the vertical direction of an image having a high density is emphasized, so that a sharp image is obtained. As a result, the quality of a reproduced image is increased.

Parallel scanning and vertical contour correction in the bidirectional progressive scanning are performed by the common vertical velocity modulation coil VMV, so that the video display apparatus is miniaturized and is reduced in cost.

Furthermore, the movement control signal SD is clamped to a predetermined voltage by the clamping circuit 14, so that the part of each of the scanning lines moves from its original reference position in a luminance change portion in the vertical direction while being held in the original reference position. Consequently, the image quality is prevented from being degraded by the shift of the scanning line.

Since the luminance change portion is detected in the vertical direction by the vertical correlation detection circuit 12 before the time axis of the movement control signal is reversed by the retrace period reversion circuit 13, the configuration of the vertical correlation detection circuit 12 is not complicated, thereby reducing the circuit scale.

Figure 16:
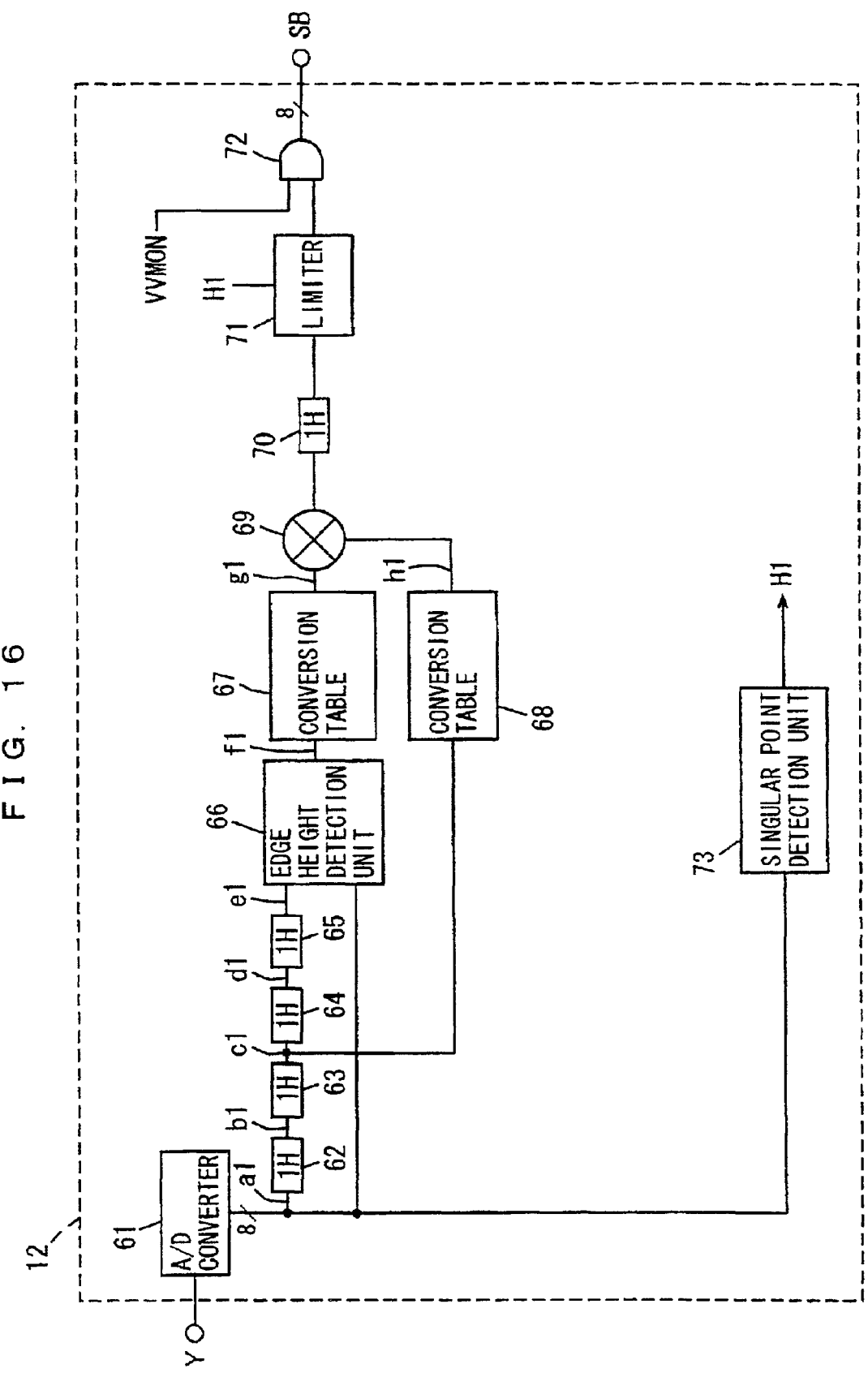
FIG. 16 is a block diagram showing another example of the configuration of a vertical correlation detection circuit.

FIG. 16 is a block diagram showing another example of the configuration of the vertical correlation detection circuit 12 shown in FIG. 5.

The vertical correlation detection circuit 12 shown in FIG. 16 comprises an A/D converter 61, delay circuits 62, 63, 64, and 65, an edge height detection unit 66, conversion tables 67 and 68, a multiplier 69, a delay circuit 70, a limiter 71, and an AND gate 72, and a singular point detection unit 73.

The A/D converter 61 converts the luminance signal Y fed from the video signal processing circuit 1 shown in FIG. 1 into a 8-bit digital signal a1. The delay circuit 62 delays the digital signal a1 outputted from the A/D converter 61 by one horizontal scanning period, and outputs a delayed 8-bit digital signal b1. The delay circuit 63 delays the digital signal b1 outputted from the delay circuit 62 by one horizontal scanning period, and outputs a delayed 8-bit digital signal c1. The delay circuit 64 delays the digital signal c1 outputted from the delay circuit 63 by one horizontal scanning period, and outputs a delayed 8-bit digital signal d1. The delay circuit 65 delays the digital signal d1 outputted from the delay circuit 64 by one horizontal scanning period, and outputs a delayed 8-bit digital signal e1.

The edge height detection unit 66 calculates the difference between the digital signal e1 outputted from the delay circuit 65 and the digital signal a1 outputted from the A/D converter 61, and outputs the difference as an edge height signal f1.

The digital signal c1 outputted from the delay circuit 63 corresponds to the luminance of a part of a scanning line to be an object, the digital signal e1 outputted from the delay circuit 65 corresponds to the luminance of a part of a scanning line two horizontal scanning periods ahead of the part of the scanning line to be the object, and the digital signal a1 outputted from the A/D converter 61 corresponds to the luminance of a part of a scanning line two horizontal scanning periods behind the part of the scanning line to be the object. Consequently, the edge height signal f1 represents the difference between the luminance of the part of the scanning line two horizontal scanning periods ahead of and the luminance of the part of the scanning line two horizontal scanning periods behind the part of the scanning line to be the object.

The conversion table 67 converts the edge height signal f1 such that the part of the scanning line to be the object moves up and down when its edge height is not less than a predetermined value, and outputs a conversion signal g1. On the other hand, the conversion table 68 converts the digital signal c1 outputted from the delay circuit 63 in a method, described later, such that the part of the scanning line to be the object moves up and down when the luminance of the scanning line to be the object is not less than a predetermined value, and outputs a conversion signal h1.

The multiplier 69 multiples the conversion signal g1 outputted from the conversion table 67 and the conversion signal h1 outputted from the conversion table 68 together, and outputs the result of the multiplication as a movement control signal. The delay circuit 70 delays the movement control signal outputted from the multiplier 69 by one horizontal scanning period. The delay circuit 70 is provided in order that the delay time of the signal from the delay circuit 62 to the limiter 71 through the multiplier 69 and the delay time of the signal in the singular point detection unit 73, described later, synchronized with each other.

The limiter 71 limits the distance of movement on the screen of the scanning line to be the object on the basis of a singular point detection signal H1 fed from the singular point detection unit 73. That is, the limiter 71 limits the movement control signal outputted from the delay circuit 70 to half when a singular point is detected by the singular point detection unit 73, while outputting the movement control signal outputted from the delay circuit 70 as it is when no singular point is detected by the singular point detection unit 73.

The movement control signal outputted from the limiter 71 is fed to one input terminal of the AND gate 72, and a vertical velocity modulation on-off signal VVMON is fed to the other input terminal thereof. When the vertical velocity modulation on-off signal VVMON is "1", vertical velocity modulation is on. In this case, the AND gate 72 outputs the movement control signal fed from the limiter 71. On the other hand, when the vertical velocity modulation on-off signal VVMON is "0", vertical velocity modulation is off. In this case, the output signal of the AND gate 72 is "0". The output signal of the AND gate 72 is fed as the movement control signal SB to the retrace period reversion circuit 13 shown in FIG. 5.

Figure 17:
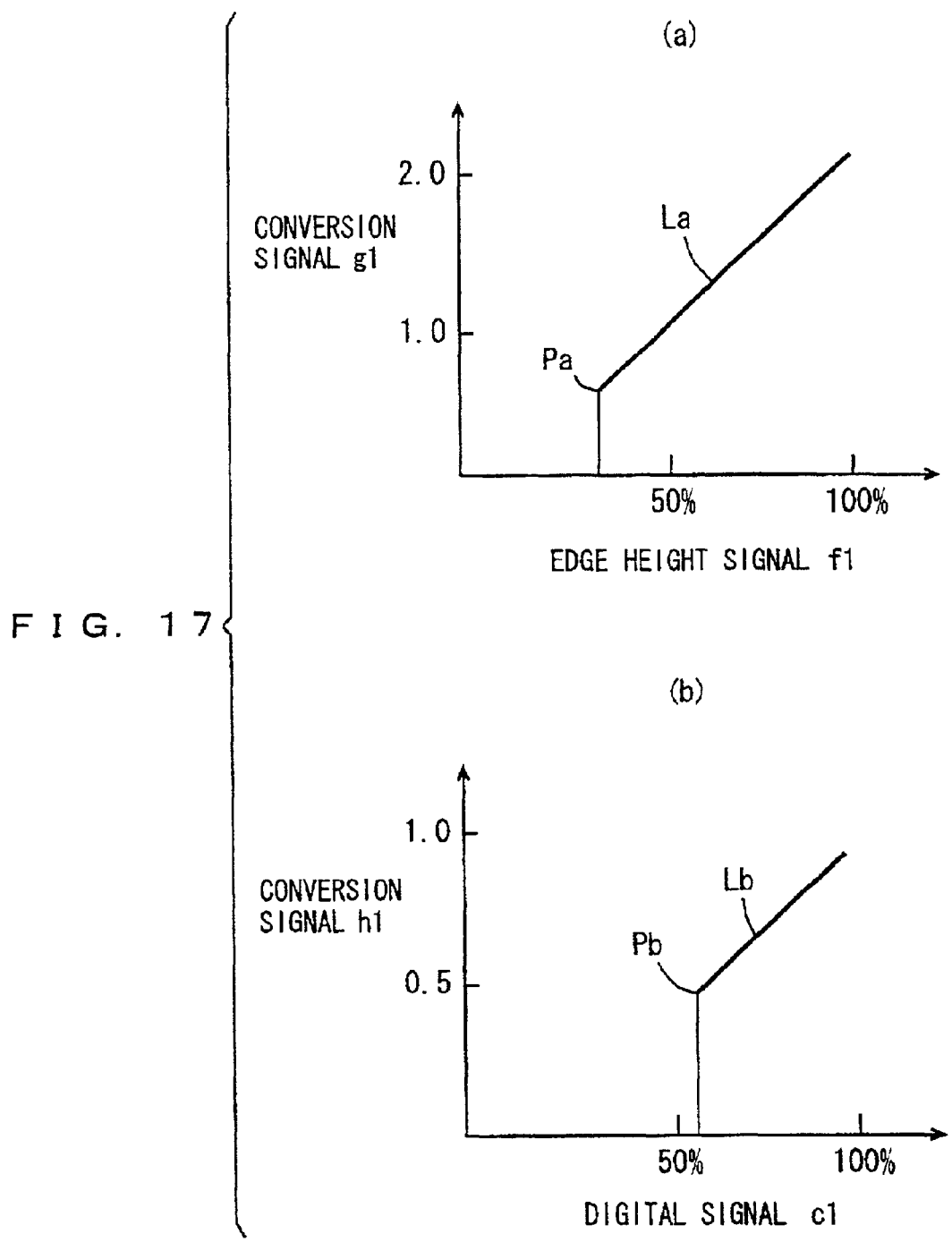
FIG. 17 is a diagram showing an example of the characteristics of a conversion table shown in FIG. 16.

FIG. 17(a) is a diagram showing an example of the characteristics of the conversion table 67. In the example shown in FIG. 17(a), the value of the conversion signal g1 is changed from 0 to 2.0 depending on the value of the edge height signal f1. When the value of the edge height signal f1 is smaller than a predetermined value, the value of the conversion signal g1 becomes zero. That is, vertical velocity modulation is effective in a portion where the edge height is large. When the edge height is smaller than the predetermined value, therefore, the distance of movement on the screen of the scanning line is set to zero by coring processing such that no vertical velocity modulation is performed.

In this case, the edge height corresponds to the difference between the luminance of the part of the scanning line two horizontal scanning periods ahead of and the luminance of the part of the scanning line two horizontal scanning periods behind the part of the scanning line to be the object.

When the value of the edge height signal f1 is not less than the predetermined value, the value of the conversion signal g1 increases depending on the value of the edge height signal f1. That is, the larger the edge height is, the larger the distance of movement on the screen of the scanning line is set. In this case, an increase start point Pa and an inclination of a characteristic line La are used as parameters for image quality correction, and are set to their most effective states. The characteristic line La may be a primary curve or a secondary curve. Alternatively, it may be another curve. The value 1.0 the conversion signal g1 corresponds to the interval between the two scanning lines.

FIG. 17(b) is a diagram showing an example of the characteristics of the conversion table 68. In the example shown in FIG. 17(b), the value of the conversion signal h1 is changed from 0 to 1.0 depending on the value of the digital signal c1. When the value of the data signal c1 is smaller than a predetermined value, the value of the conversion signal h1 becomes zero. That is, vertical velocity modulation is effective in a case where the luminance of the part of the scanning line to be the object is high. When the luminance is lower than the predetermined value, therefore, the distance of movement on the screen of the scanning line is set to zero by coring processing such that no vertical velocity modulation is performed.

When the value of the digital signal c1 is not less than the predetermined value, the value of the conversion signal h1 increases depending on the value of the digital signal c1. That is, the higher the luminance of the scanning line to be an object is, the larger the distance of movement on the screen of the scanning line is set. In this case, an increase start point Pa and an inclination of a characteristic line Lb are used as parameters for image quality correction, and are set to their most effective states. The characteristic line Lb may be a primary curve or a secondary curve. Alternatively, it may be another curve. The value 1.0 the conversion signal h1 corresponds to the interval between the two scanning lines.

Figure 18:
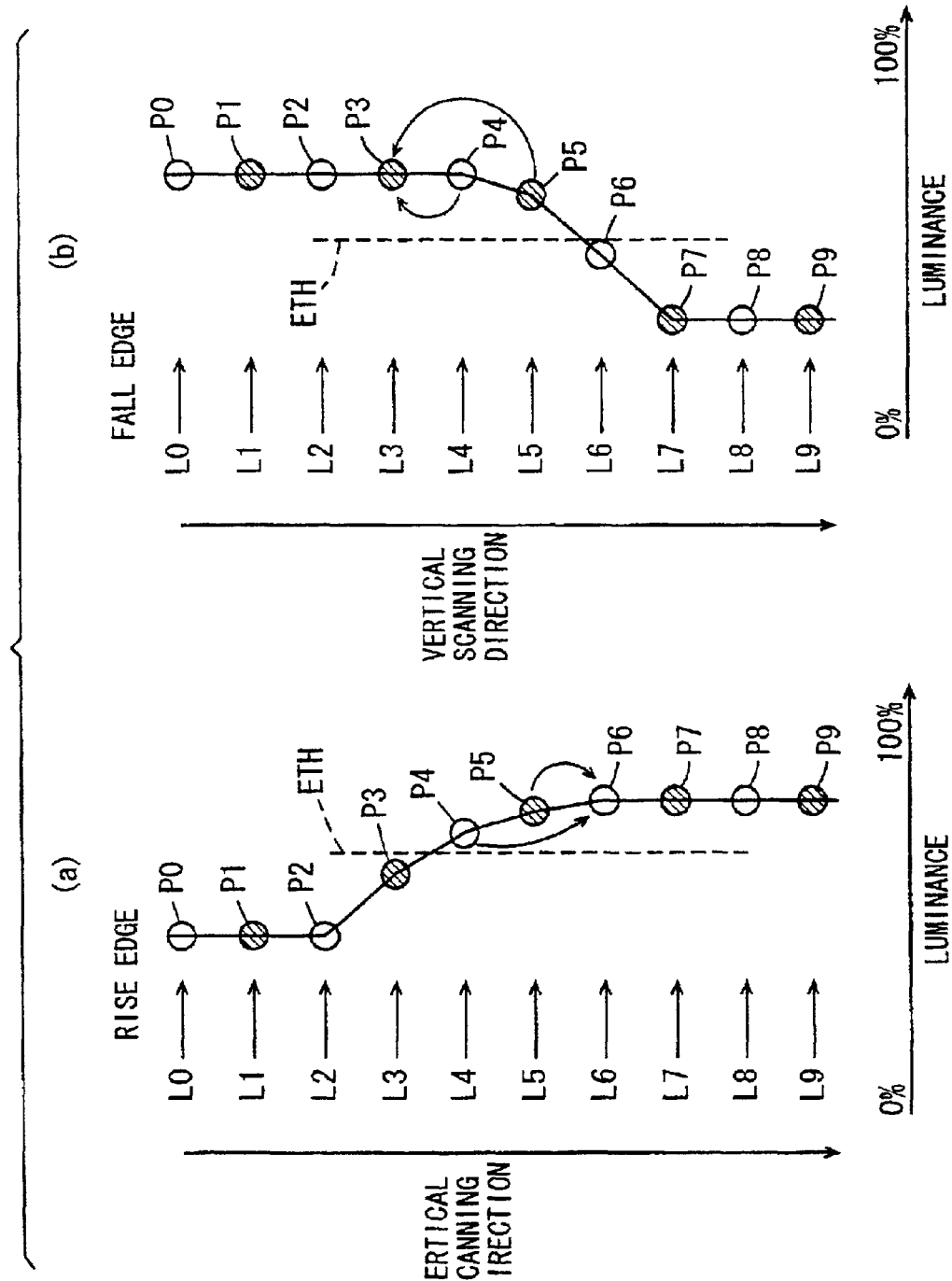
FIG. 18 is a diagram showing an example of vertical velocity modulation by the vertical correlation detection circuit shown in FIG. 16.

FIG. 18 is a diagram showing an example of the vertical velocity modulation by the vertical correlation detection circuit 12 shown in FIG. 16, where FIG. 18(a) illustrates a rise edge (an upper edge), and FIG. 18(b) illustrates a fall edge (a lower edge).

In FIG. 18, the luminances of scanning lines L0 to L9 are respectively indicated by P0 to P9. The scanning lines L1, L3, L7, and L9 respectively indicated by hatched circles are scanning lines obtained by interpolation processing.

In the example shown in FIG. 18(a), the respective luminances P2 to P6 of the scanning line L2 to the scanning line L6 are gradually increased. Since the luminance P3 of the scanning line L3 is lower than a predetermined threshold level ETH, so that the scanning line L3 does not move. Since the luminance P4 of the scanning line L4 and the luminance P5 of the scanning line L5 exceed the predetermined threshold level ETH, the scanning line L4 and the scanning line L5 so moves as to approach the scanning line L6. The three scanning lines L4, L5, and L6 are thus concentrated, thereby obtaining a sharp image whose contour in the vertical direction is emphasized. As a result, the quality of a reproduced image is increased.

In the example shown in FIG. 18(b), the respective luminances P3 to P the scanning line L3 to the scanning line L7 are gradually decreased. Since the luminance P6 of the scanning line L6 is lower than a predetermined threshold level ETH, so that the scanning line L6 does not move. Since the luminance P4 of the scanning line L4 and the luminance P5 of the scanning line L5 exceed the predetermined threshold level ETH, the scanning line L4 and the scanning line L5 so moves as to approach the scanning line L3. The three scanning lines L3, L4, and L5 are thus concentrated, thereby obtaining a sharp image whose contour in the vertical direction is emphasized. As a result, the quality of a reproduced image is increased.

Figure 19:
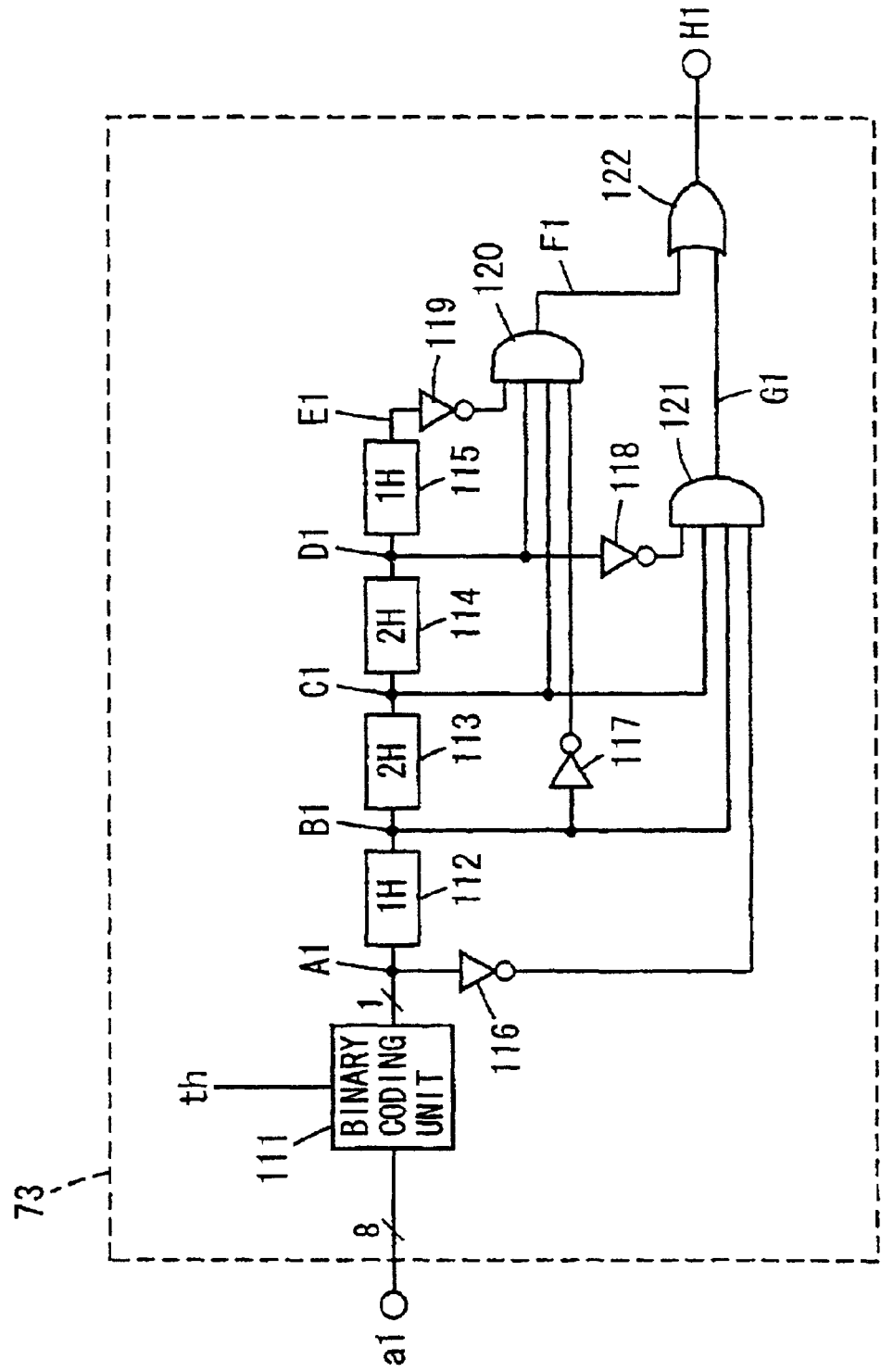
FIG. 19 is a diagram showing an example of the configuration of a singular point detection unit shown in FIG. 16.

FIG. 19 is a block diagram showing an example of the configuration of the singular point detection unit 73 shown in FIG. 16.

As shown in FIG. 19, the singular point detection unit 73 comprises a binary-coding unit 111, delay circuits 112, 113, 114, and 115, inverters 116, 117, 118, and 119, AND gates 120 and 121, and an OR gate 122.

A predetermined threshold value th is given to the binary-coding unit 111. The binary-coding unit 111 binary-codes the digital signal al outputted from the A/D converter 61 shown in FIG. 16 on the basis of the threshold value th, and outputs a one-bit digital signal A1. The delay circuit 112 delays the digital signal A1 outputted from the binary-coding unit 111 by one horizontal scanning period, and outputs a delayed one-bit digital signal B1. The delay circuit 113 delays the digital signal B1 outputted from the delay circuit 112 by two horizontal scanning periods, and outputs a delayed one-bit digital signal C1. The delay circuit 114 delays the digital signal C1 outputted from the delay circuit 113 by two horizontal scanning periods, and outputs a delayed one-bit digital signal D1. The delay circuit 115 delays the digital signal D1 outputted from the delay circuit 114 by one horizontal scanning period, and outputs a delayed one-bit digital signal E1.

The inverter 116 inverts the digital signal A1 outputted from the binary-coding unit 111. The inverter 117 inverts the digital signal B1 outputted from the delay circuit 112. The inverter 117 inverts the digital signal B1 outputted from the delay circuit 112. The inverter 118 inverts the digital signal D1 outputted from the delay circuit 114. The inverter 119 inverts the digital signal E1 outputted from the delay circuit 115.

An output signal of the inverter 117, the digital signal C1 outputted from the delay circuit 113, the digital signal D1 outputted from the delay circuit 114, and an output signal of the inverter 119 are respectively fed to four input terminals of the AND gate 120. An output signal of the inverter 116, the digital signal B1 outputted from the delay circuit 112, the digital signal C1 outputted from the delay circuit 113, and an output signal of the inverter 118 are respectively fed to four input terminals of the AND gate 121. An output signal F1 of the AND gate 120 and an output signal G1 of the AND gate 121 are respectively fed to two input terminals of the OR gate 122. An output signal of the OR gate 122 is fed as the singular point detection signal H1 to the limiter 71 shown in FIG. 16.

FIG. 20 is a diagram showing an example of singular point detection. FIG. 21 is a diagram showing the logic of a signal in each portion in the singular point detection circuit 73. Referring to FIGS. 20 and 21, description is made of the operation of the singular point detection circuit 73 shown in FIG. 19.

In FIG. 20, the luminances of scanning lines L0 to L9 are respectively indicated by P0 to P9. The scanning lines L1, L3, L7, and L9 respectively indicated by hatched circles are scanning lines obtained by interpolation processing.

In the example shown in FIG. 20, the luminance P4 of the scanning line L4 is higher than a predetermined threshold level ETH, and the edge height of the scanning line L4 (i.e., the difference between the luminance P6 of the scanning line L6 and the luminance P2 of the scanning line L2) is larger than a predetermined value, so that the scanning line L4 is moved in the direction away from the scanning line L3. The luminance P6 of the scanning line L6 is higher than the predetermined threshold level ETH, and the edge height of the scanning line L6 (i.e., the difference between the luminance of the scanning line L8 and the luminance P4 of the scanning line L4) is larger than the predetermined value, so that the scanning line L6 is moved in the direction away from the scanning line L7. At this time, when the scanning line L4 is moved by an amount corresponding to two scanning lines, and the scanning line L6 is moved by an amount corresponding to two scanning lines, the position of the scanning line L4 and the position of the scanning line L6 are replaced with each other. Therefore, the distance of movement on the screen is limited to half using the scanning line L4 as a singular point in rise, while being limited to half using the scanning line L6 as a singular point in fall.

It is detected whether or not the scanning line L4 is a singular point in rise when the digital signals A1, B1, C1, D1, and E1 respectively correspond to the luminances P7, P6, P4, P2, and P1 of the scanning lines L7, L6, L4, L2, and L1. In this case, the digital signals A1 to E1 are respectively "0", "1", "1", "0", and "0". Consequently, the output signal G1 of the AND gate 121 is "1" and the singular point detection signal H1 is "1". as shown in FIG. 21.

It is detected whether or not the scanning line L6 is a singular point in a fall edge when the digital signals A1, B1, C1, D1, and E1 respectively correspond to the luminances P9, P8, P6, P4, and P3 of the scanning lines L9, L8, L6, L4, and L3. In this case, the digital signals Al to El are respectively "0", "0", "1", "1", and "0". Consequently, the output signal F1 of the AND gate 120 is "1", and the singular point detection signal H1 is "1", as shown in FIG. 21. 5 When the singular point detection signal H1 is "1", the movement control signal is limited to half by the limiter 71 shown in FIG. 16. Consequently, the scanning line L4 so moves as to approach the scanning line L5, and the scanning line L6 so moves as to approach the scanning line L5. The amounts of movement in this case are respectively not more than the interval between the two scanning lines.

When a video signal in an interlaced scanning system of 525 scanning lines is converted into a video signal in a progressive scanning system of 525 scanning lines, the vertical frequency which can be displayed (vertical resolution) is 525 per four scanning lines in a moving image, while being 525 per two scanning lines in a still image. A vertical frequency component corresponding to the vertical resolution of approximately 525 per two scanning lines is referred to as a high frequency component, and a vertical frequency component corresponding to the vertical resolution of approximately 525 per four scanning lines is referred to as an intermediate frequency component.

In the vertical correlation detection circuit 12 shown in FIG. 16, the difference between the luminance of a part of a scanning line two horizontal scanning periods ahead of and the luminance of a part of a scanning line two vertical scanning periods behind a part of a scanning line to be an object is calculated, to extract an intermediate frequency component in the vertical direction. Therefore, it is possible to effectively emphasize the contour of an image including a lot of intermediate frequency components. Particularly, it is possible to sufficiently improve the quality of white characters.

For example, in an interlaced scanning system of 525 scanning lines, a high frequency component in the vertical direction is reduced by limiting the band of the vertical frequency to some extent in order to prevent flicker in encoding a video signal. In the case of the interlaced scanning system, the vertical resolution of a moving image is one-half the vertical resolution of a still image. In a general image, the ratio of the moving image is significantly high.

In a video display apparatus for converting a video signal in the interlaced scanning system of 525 scanning lines into a video signal in a progressive scanning system of 525 scanning lines, and further converting the video signal into a video signal in a progressive scanning system of 1050 scanning lines, the vertical correlation detection circuit 12 shown in FIG. 16 is used, thereby making it possible to effectively emphasize the contour of an image.

The video signal in the progressive scanning system of 525 scanning lines which is inputted from a set top box (STB) is obtained by converting the video signal in the interlaced scanning system of 525 scanning lines into the video signal in the progressive scanning system using an interpolated line, so that it includes more intermediate frequency components in the vertical direction, as compared with high frequency components in the vertical direction, similarly to the video signal in the interlaced scanning system of 525 scanning lines. In the video display apparatus for converting the video signal in the progressive scanning system of 525 scanning lines which is inputted from the set top box into the video signal in the progressive scanning system of 1050 scanning lines, the vertical correlation detection circuit 12 shown in FIG. 16 is used, thereby making it possible to effectively emphasize the contour of an image.

On the other hand, the video signal in the general progressive scanning system of 525 scanning lines has high vertical resolution. In the video display apparatus for converting the video signal in the progressive scanning system of 525 scanning lines into the video signal in the progressive scanning system of 1050 scanning lines, therefore, it is possible to synthesize interpolated lines having high resolution irrespective of a still image or a moving image. In such a case, therefore, it is preferable that the difference between the luminance of a part of a scanning line one horizontal scanning period ahead of and the luminance of a part of a scanning line one horizontal scanning period behind a part of a scanning line to be an object is calculated to extract a high frequency component in the vertical direction. Description is now made of a vertical correlation detection circuit capable of extracting an intermediate frequency component and a high frequency component.

Figure 22:
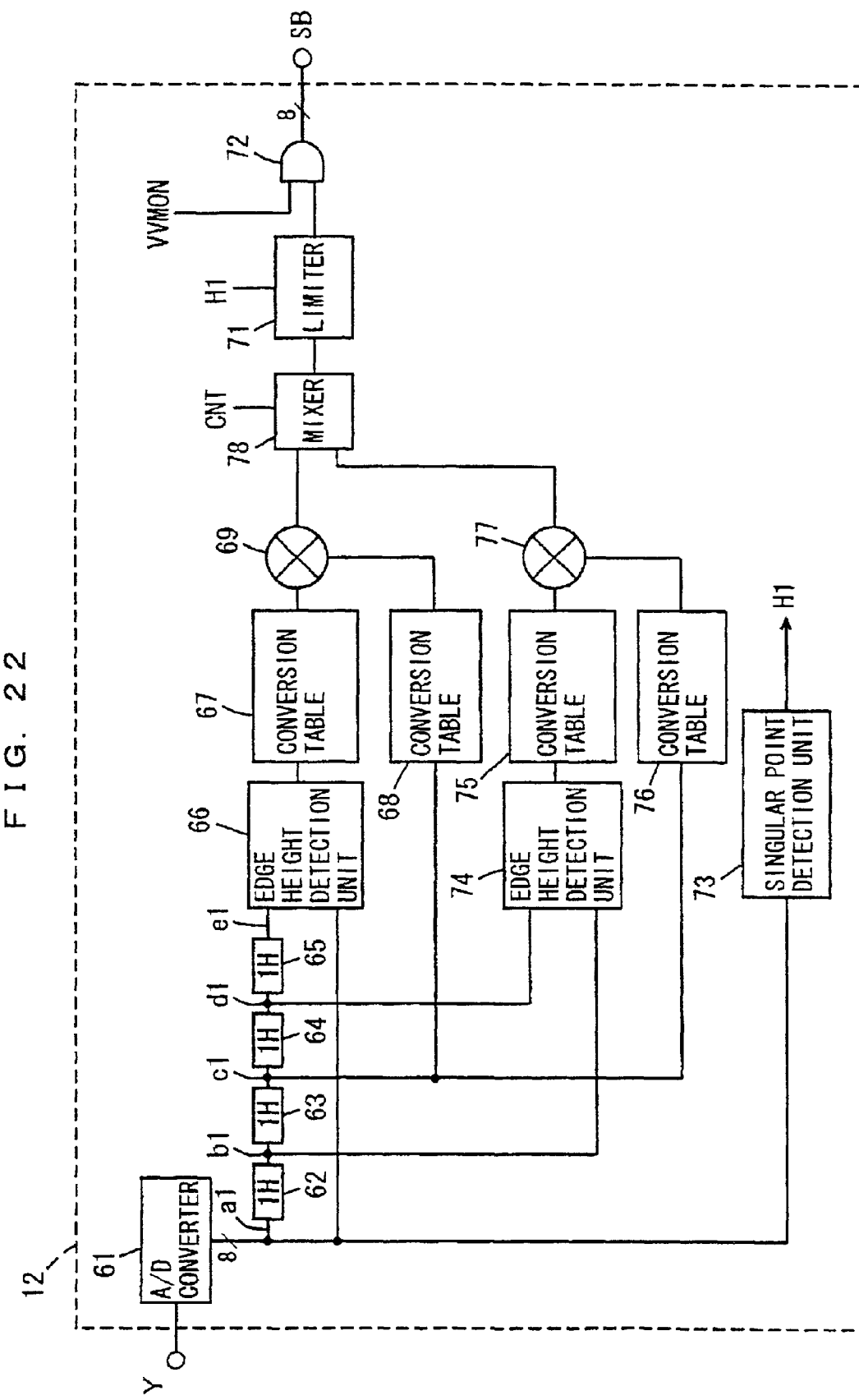
FIG. 22 is a block diagram showing still another example of the configuration of a vertical correlation detection circuit.

FIG. 22 is a block diagram showing still another example of the configuration of the vertical correlation detection circuit 12 shown in FIG. 3.

In the vertical correlation detection circuit 12 shown in FIG. 22, an edge height detection unit 74, conversion tables 75 and 76, a multiplier 77, and a mixer 78 are further provided in addition to the configuration of the vertical correlation detection circuit 12 shown in FIG. 16. The configuration of the other portions in the vertical correlation detection circuit 12 shown in FIG. 22 is the same as the configuration of those in the vertical correlation detection circuit 12 shown in FIG. 16.

The edge height detection unit 74 calculates the difference between a digital signal d1 outputted from a delay circuit 64 and a digital signal b1 outputted from a delay circuit 62, and outputs the difference as an edge height signal. The digital signal d1 outputted from the delay circuit 64 corresponds to the luminance of a part of a scanning line one horizontal scanning period ahead of a part of a scanning line to be an object, and the digital signal b1 outputted from the delay circuit 62 corresponds to the luminance of a part of a scanning line one horizontal scanning period behind the part of the scanning line to be the object. Consequently, the edge height signal outputted from the edge height detection unit 74 represents the difference between the luminance of the part of the scanning line one horizontal scanning period ahead of and the luminance of the scanning line one horizontal scanning period behind the part of the scanning line to be the object.

The conversion table 75 converts the edge height signal outputted from the edge height detection unit 74 such that the part of the scanning line to be the object moves up and down when its edge height is not less than a predetermined value, similarly to a conversion table 67, and outputs a conversion signal. On the other hand, the conversion table 76 converts a digital signal c1 outputted from a delay circuit 63 such that the part of the scanning line to be the object moves up and down when the luminance of the scanning line to be the object is not less than a predetermined value, similarly to a conversion table 68, and outputs a conversion signal.

The multiplier 77 multiples the conversion signal outputted from the conversion table 75 and the conversion signal outputted from the conversion table 76 together, and outputs the result of the multiplication as a movement control signal. The mixer 78 respectively weights a movement control signal outputted from a multiplier 69 and the movement control signal outputted from the multiplier 77 in response to a control signal CNT, adds the signals, and outputs the result of the addition as a movement control signal. The operations of the other portions in the vertical correlation detection circuit 12 shown in FIG. 22 are the same as those in the vertical correlation detection circuit 12 shown in FIG. 16.

In the vertical correlation detection circuit 12 shown in FIG. 22, the weighting of the movement control signal outputted from the multiplier 69 and the weighting of the movement control signal outputted from the multiplier 77 are adjusted by the mixer 78, thereby making it possible to effectively emphasize the contour in the vertical direction of an image including a lot of intermediate frequency components and an image including a lot of high frequency components.

Figure 23:
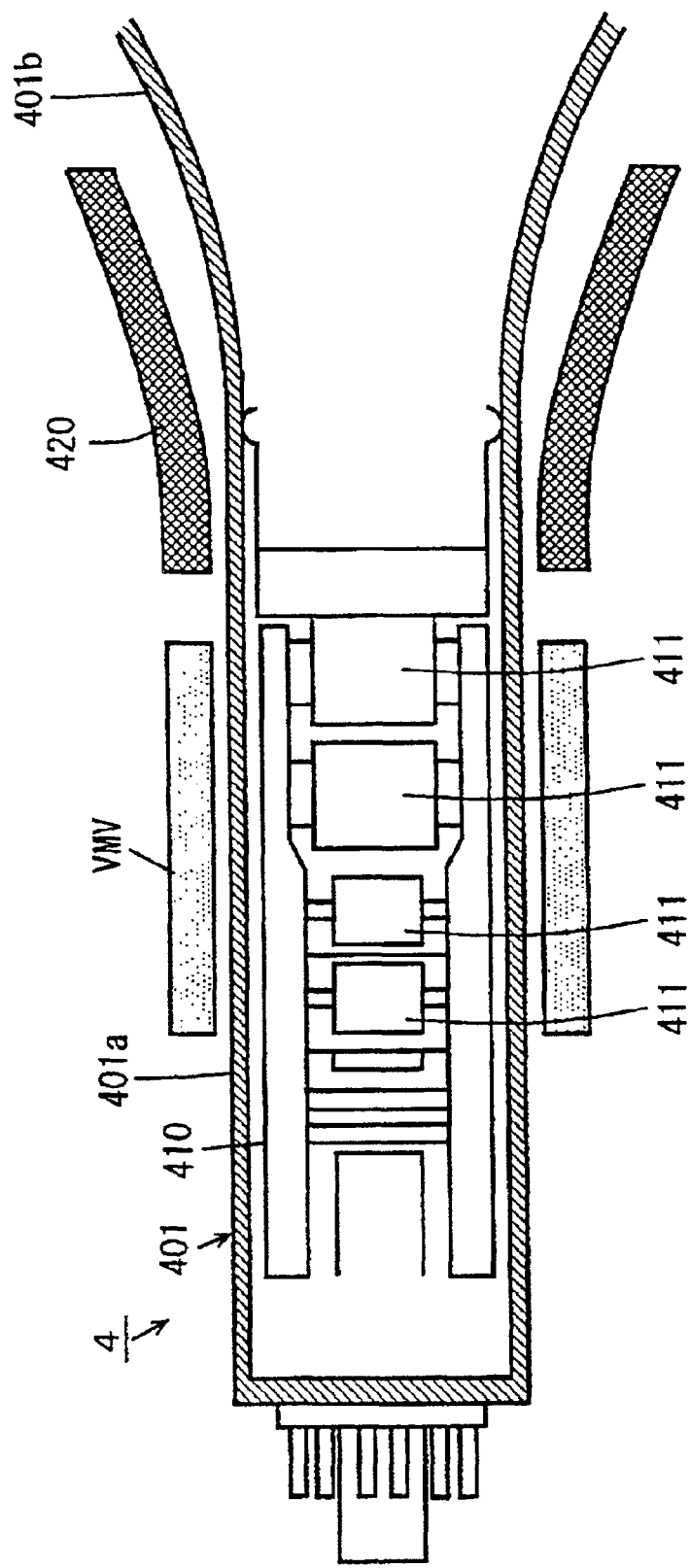
FIG. 23 is a cross-sectional view in the horizontal direction showing an example of the positional relationship between a CRT and a vertical velocity modulation coil.
Figure 24:
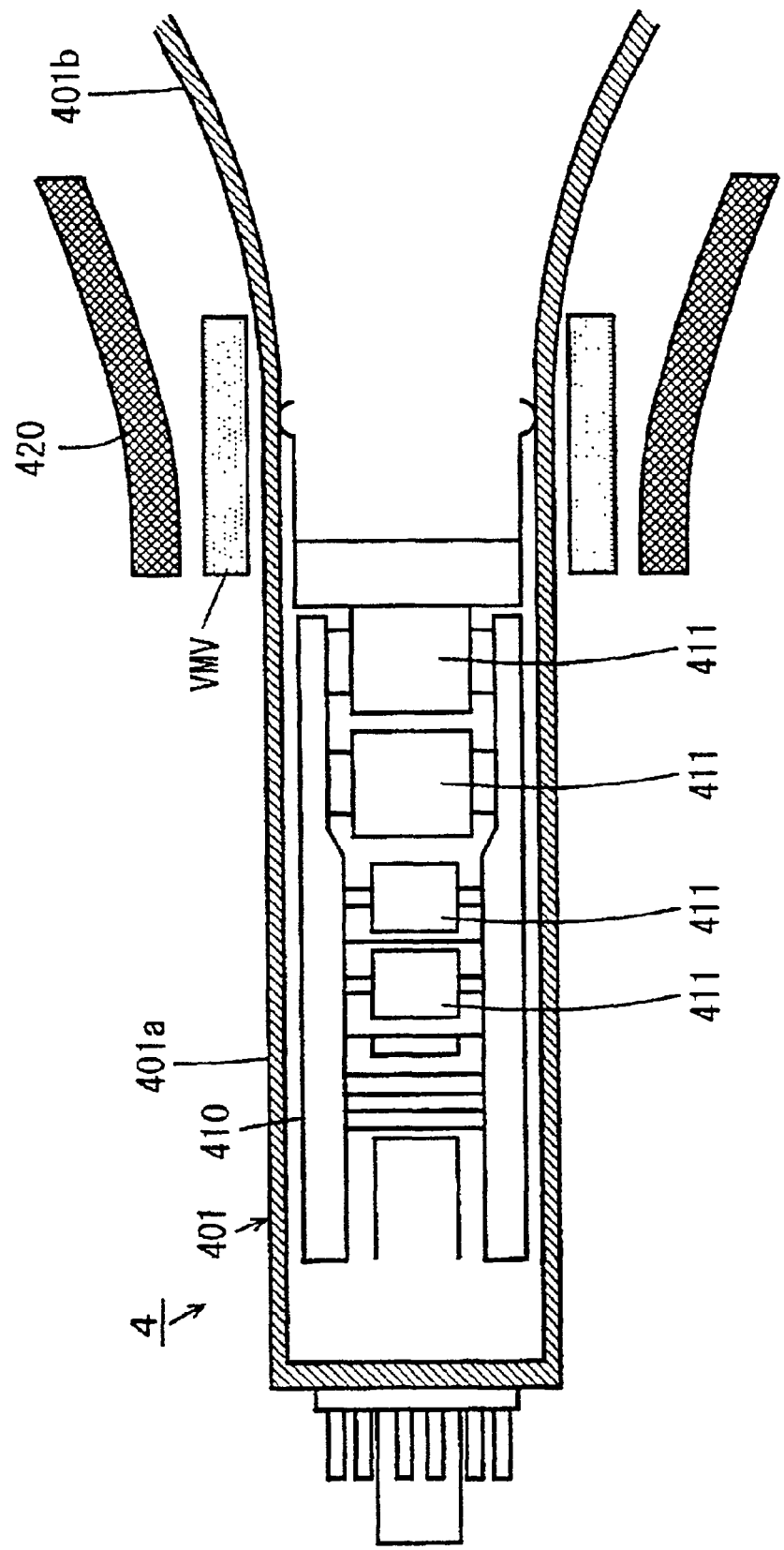
FIG. 24 is a cross-sectional view in the horizontal direction showing another example of the positional relationship between a CRT and a vertical velocity modulation coil.

FIGS. 23 and 24 are cross-sectional views in the horizontal direction showing the positional relationship between a CRT 4 and a vertical velocity modulation coil VMV. FIG. 23 shows an example of the arrangement of the vertical velocity modulation coil VMV, and FIG. 24 shows another example of the arrangement of the vertical velocity modulation coil VMV.

As shown in FIGS. 23 and 24, a glass bulb 401 of the CRT 4 has a cylindrical neck 401a and an expanded cone 401b. An electron gun 410 is arranged within the net 401a of the glass bulb 401. The electron gun 410 is provided with a plurality of metal cases 411 constituting a plurality of electrodes. A deflection yoke 420 comprises a horizontal deflection coil LH and a vertical deflection coil LV shown in FIG. 1. The deflection yoke 420 is arranged in a position including the boundary between the neck 401a and the cone 401b outside the CRT 4.

In the example shown in FIG. 23, the vertical velocity modulation coil VMV is arranged around the neck 401a of the CRT 4. On the other hand, in the example shown in FIG. 24, the vertical velocity modulation coil VMV is arranged around the boundary between the neck 401a and the cone 401b of the CRT 4 and inside the deflection yoke 420.

Figure 25:
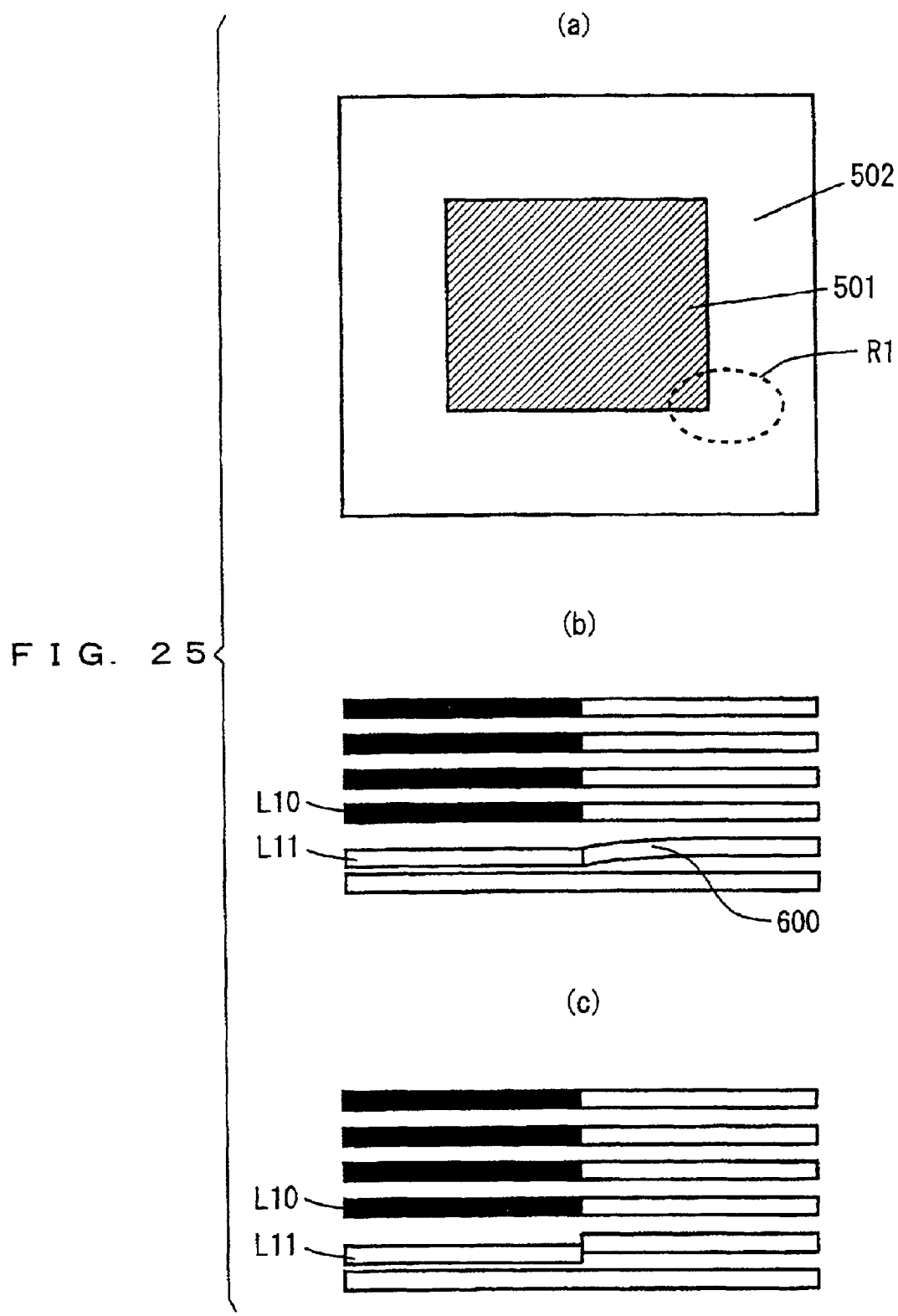
FIG. 25 is a diagram showing an example of vertical velocity modulation by the vertical velocity modulation coil shown in FIGS. 23 and 24.

FIG. 25 is a diagram showing an example of vertical velocity modulation by the vertical velocity modulation coil VMV shown in FIGS. 23 and 24. FIG. 25(a) illustrates an example of an image, FIG. 25(b) illustrates the change of scanning lines by the vertical velocity modulation coil VMV shown in FIG. 23, and FIG. 25(c) illustrates the change of scanning lines by the vertical velocity modulation coil VMV shown in FIG. 24.

In the image shown in FIG. 25(a), the luminance of a rectangular region 501 is low, and the luminance of a region 502 around the region 501 is high. In FIG. 25(b), an enlarged view of a region R1 indicated by a broken line in FIG. 25(a) is illustrated. By the vertical velocity modulation, the scanning speed in the vertical direction of an electron beam is modulated such that a part of a scanning line L11 having a high luminance moves farther apart from a low luminance part of an adjacent scanning line L10.

In the example shown in FIG. 23 in which the vertical velocity modulation coil VMV is arranged around the neck 401a of the CRT 4, a magnetic field formed by the vertical velocity modulation coil VMV strikes the metal cases 411 of the electron gun 410. Although a low frequency component of the magnetic field penetrates the metal cases 411, intermediate and high frequency components of the magnetic field generate an eddy current in the metal cases 111, so that the intermediate and high frequency components are converted into heat. Therefore, the intermediate and high frequency components of the magnetic field are attenuated by the metal cases 411 of the electron gun 410. Consequently, the gain of the low frequency component of the magnetic field is relatively larger than those of the intermediate and high frequency components of the magnetic field. As a result, a part 60 the scanning line L11 adjacent to the low luminance part of the scanning line L10 cannot sharply move in the vertical direction, as shown in FIG. 25(b).

Contrary to this, in the example shown in FIG. 24 in which the vertical velocity modulation coil VMV is arranged inside the deflection yoke 420, a magnetic field formed by the vertical velocity modulation coil VMV does not strike the metal cases 411 of the electron gun 410. Accordingly, intermediate and high frequency components of the magnetic field are not attenuated. Consequently, the sensitivity of the vertical velocity modulation coil VMV is increased, so that scanning lines can be sharply changed at a small current. As a result, the part 60 the scanning line L11 adjacent to the low luminance part of the scanning line L10 can sharply move in the vertical direction, as shown in FIG. 25(c).

When the vertical velocity modulation coil VMV is thus arranged inside the deflection yoke 420, the scanning lines sharply change in a vertical edge and a horizontal edge of an image, so that the quality of the image is not degraded.

Figure 26:
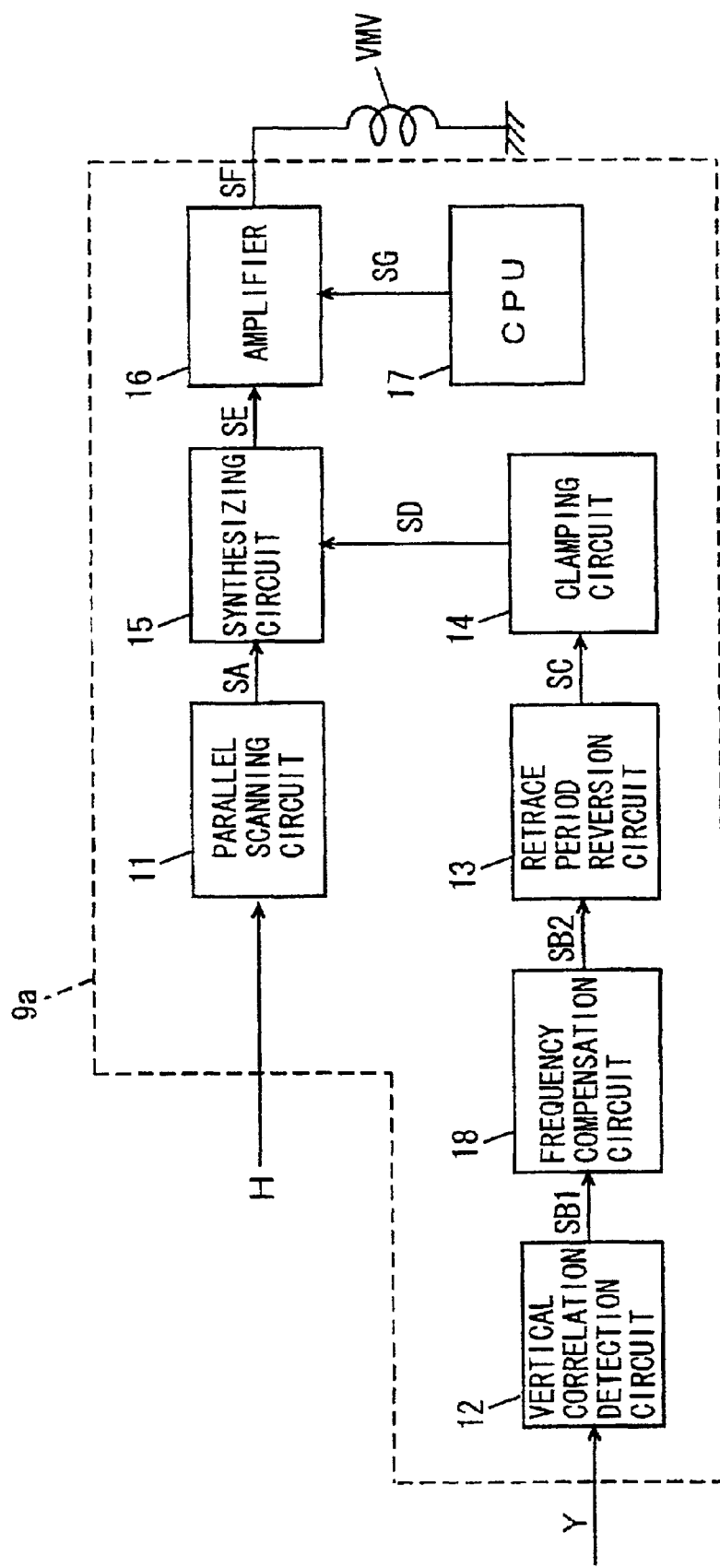
FIG. 26 is a block diagram showing another example of the configuration of a vertical velocity modulation circuit used for the video display apparatus shown in FIG. 1.

FIG. 26 is a block diagram showing another example of the configuration of a vertical velocity modulation circuit used for the video display apparatus shown in FIG. 1.

A vertical velocity modulation circuit 9a shown in FIG. 26 differs from the vertical velocity modulation circuit 9 shown in FIG. 5 in that a frequency compensation circuit 18 is provided between a vertical correlation detection circuit 12 and a retrace period reversion circuit 13.

The vertical correlation detection circuit 12 shown in FIG. 26 detects a portion where the change in luminance in the vertical direction of a scanning line exceeds a predetermined value on the basis of a luminance signal Y, and outputs a movement control signal SB1 representing the distance of movement on the screen of the scanning line. The frequency compensation circuit 18 subjects the movement control signal SB1 outputted from the vertical correlation detection circuit 12 to frequency compensation in a method, described later, and outputs a movement control signal SB2.

The retrace period reversion circuit 13 outputs the movement control signal SB2 outputted from the frequency compensation circuit 18 as it is in a trace period, while reversing the time axis of the movement control signal SB2 outputted from the frequency compensation circuit 18 in a retrace period, and outputs an obtained signal as a movement control signal SC.

In this example, the frequency compensation circuit 18 corresponds to frequency domain emphasis means.

The configuration and the operation of the other portions in the vertical velocity modulation circuit 9a shown in FIG. 26 are the same as the configuration and the operation of those in the vertical velocity modulation circuit 9 shown in FIG. 5.

Figure 27:
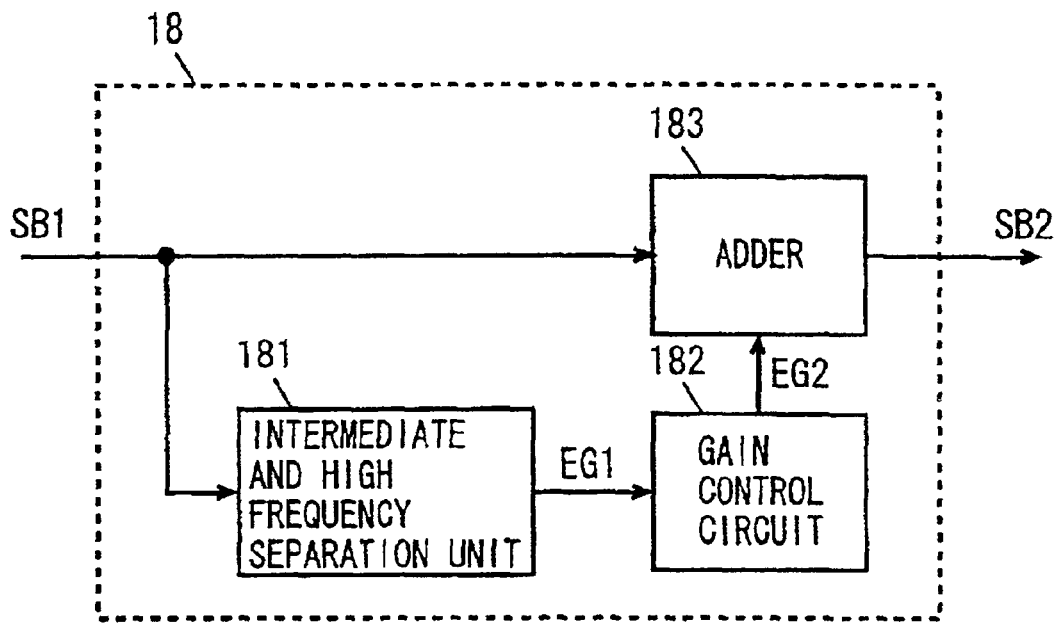
FIG. 27 is a block diagram showing the configuration of a frequency compensation circuit in the vertical velocity modulation circuit shown in FIG. 26.

FIG. 27 is a block diagram showing the configuration of the frequency compensation circuit 18 in the vertical velocity modulation circuit 9a shown in FIG. 26.

The frequency compensation circuit 18 comprises an intermediate and high frequency separation unit 181, a gain control circuit 182, and an adder 183. The intermediate and high frequency separation unit 181, the gain control circuit 182, and the adder 183 may be respectively constituted by digital circuits or analog circuits.

When the intermediate and high frequency separation unit 181, the gain control circuit 182, and the adder 183 are respectively constituted by analog circuits, a D/A (Digital/Analog) converter is provided between the vertical correlation detection circuit 12 and the frequency compensation circuit 18 shown in FIG. 26 and an A/D converter is provided between the frequency compensation circuit 18 and the retrace period reversion circuit 13.

Figure 28:
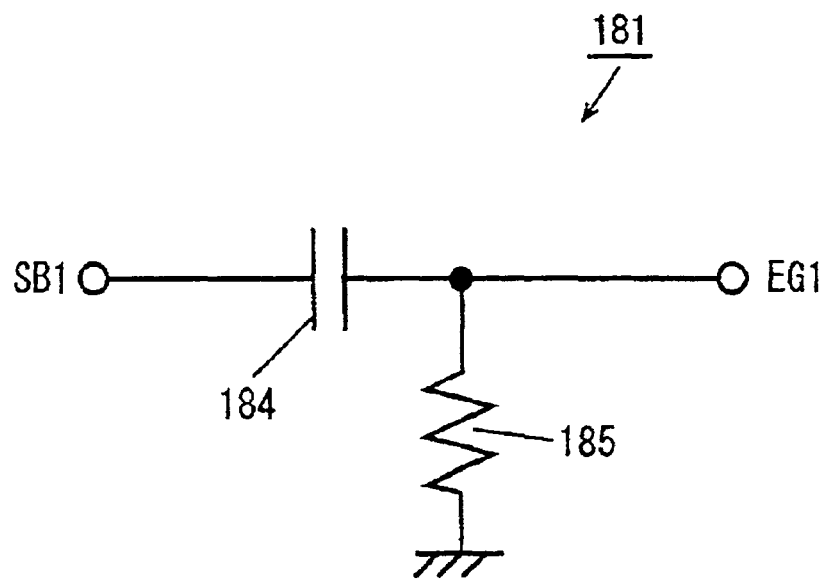
FIG. 28 is a circuit diagram showing an example of the configuration of an intermediate and high frequency component separation unit.

The intermediate and high frequency separation unit 181 is constituted by an analog high-pass filter or a primary differentiation circuit, for example. FIG. 28 is a circuit diagram showing an example of the configuration of the intermediate and high frequency separation unit 181. The intermediate and high frequency separation unit 181 shown in FIG. 28 is constituted by a primary differentiation circuit comprising a capacitor 184 and a resistor 185.

In this example, the intermediate and high frequency separation unit 181 corresponds to extraction means, and the adder 183 corresponds to addition means.

Figure 29:
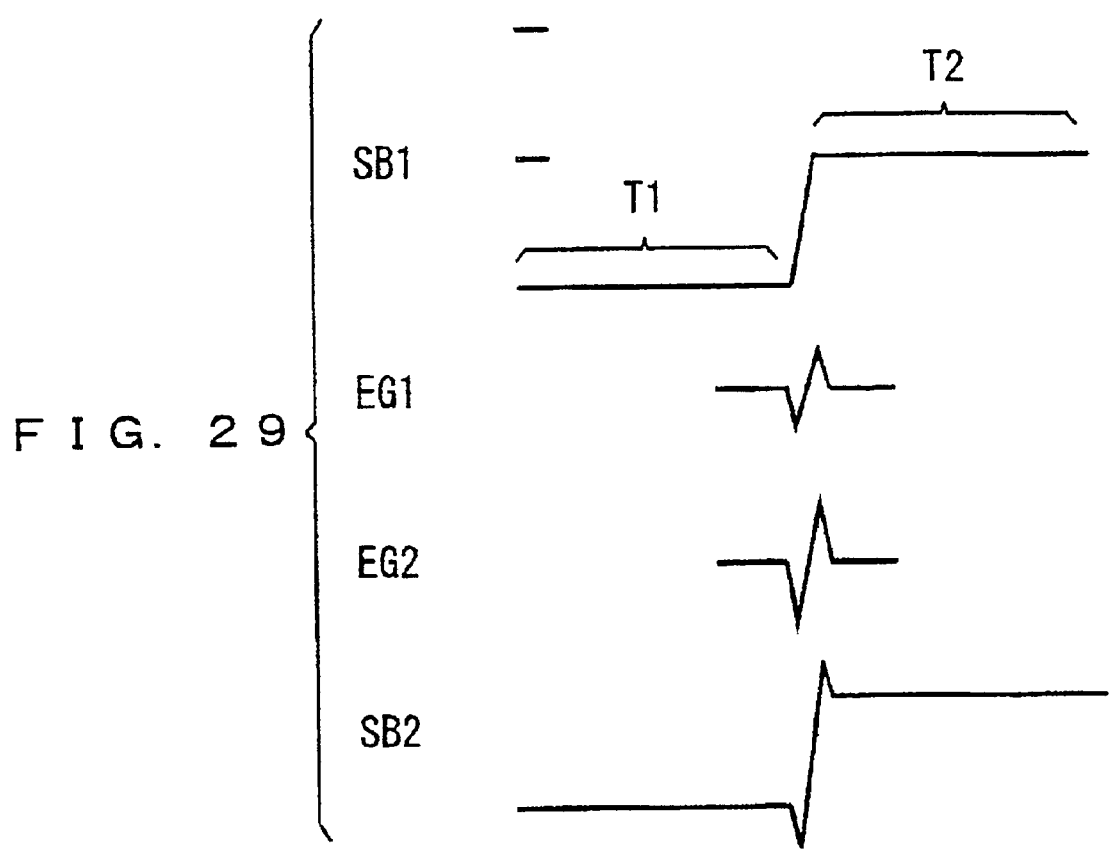
FIG. 29 is a signal waveform diagram showing the operation of the frequency compensation circuit shown in FIG. 27.

FIG. 29 is a signal waveform diagram showing the operation of the frequency compensation circuit 18 shown in FIG. 27. Referring now to the signal waveform diagram of FIG. 29, the operation of the frequency compensation circuit 18 shown in FIG. 27 will be described.

The intermediate and high frequency separation unit 181 subjects the movement control signal SB1 to primary differentiation, and outputs a differentiation signal EG1. In a low level period T1 of the movement control signal SB1, scanning lines shall move downward. In an intermediate level period T2 of the movement control signal SB1, the scanning lines does not move up and down. The movement control signal SB1 outputted from the vertical correlation detection circuit 12 shown in FIG. 26 is fed to the intermediate and high frequency separation unit 181 and the adder 183. The gain control circuit 182 amplifies the differentiation signal EG1 outputted from the intermediate and high frequency separation unit 181 by previously set gain, and feeds the amplified differentiation signal EG2 to the adder 183. The adder 183 adds the movement control signal SB1 and the differentiation signal EG2 together, and outputs the movement control signal SB2. In the movement control signal SB2. its edge is emphasized.

As a result, in the example of the image shown in FIG. 25(*a*), the part 60 the scanning line L11 adjacent to the low luminance portion of the scanning line L10 can sharply move in the vertical direction, as in FIG. 25(*c*). When the vertical velocity modulation circuit 9*a* shown in FIG. 26 is used, therefore, the scanning lines sharply change in a vertical edge and a horizontal edge of the image, so that the quality of the image is not degraded. as in the case shown in FIG. 24 in which the vertical velocity modulation coil VMV is arranged inside the deflection yoke 420.

When the arrangement of the vertical velocity modulation coil VMV shown In FIG. 24 is used, as described above, the magnetic field generated by the vertical velocity modulation coil VMV is not affected by the structure of the electron gun 410, so that signal characteristics in the vertical velocity modulation circuit 9 shown in FIG. 5 appear on the surface of the CRT 4 as they are. Consequently, vertical velocity modulation in which the image quality is not degraded is realized without providing a frequency compensation circuit.

When the vertical velocity modulation circuit 9*a* shown in FIG. 26 is used, vertical velocity modulation in which the image quality is not degraded is realized without changing the structures of the CRT 4 and the deflection yoke 420.

Figure 30:
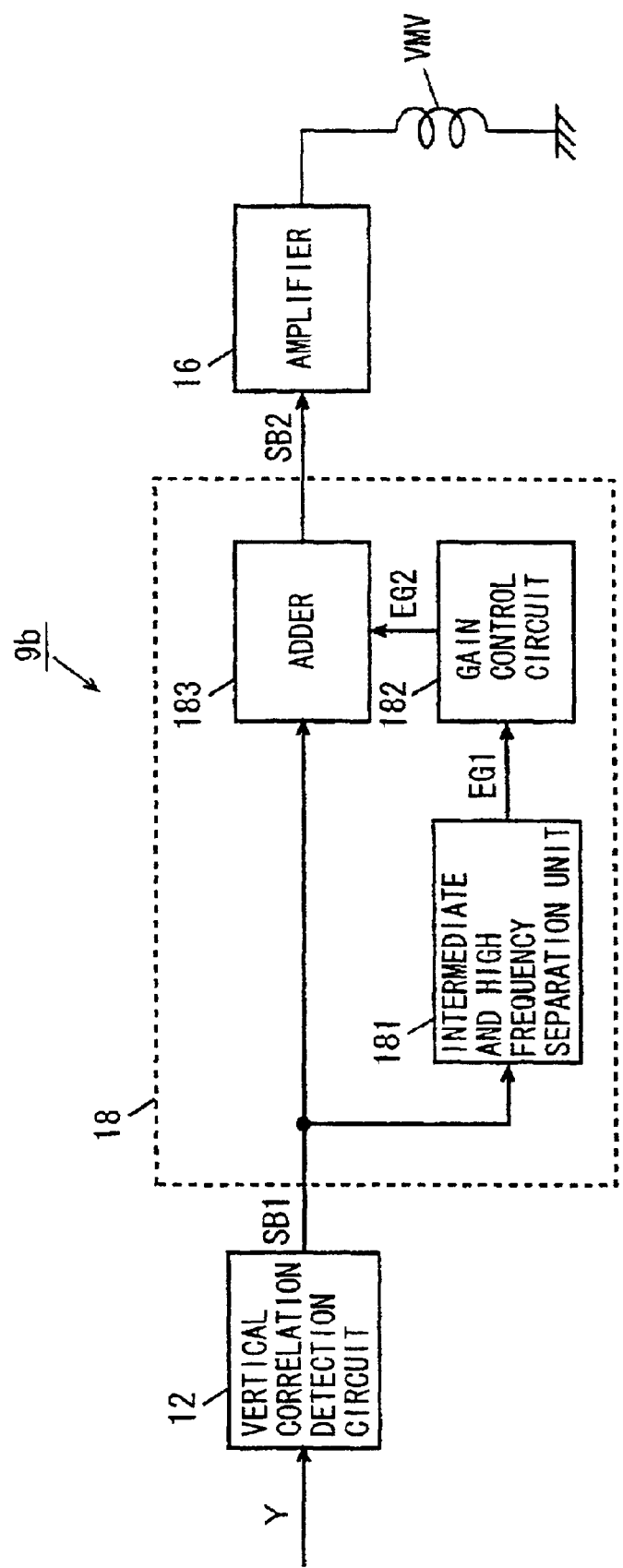
FIG. 30 is a block diagram showing still another example of the configuration of a vertical velocity modulation circuit.
Figure 31:
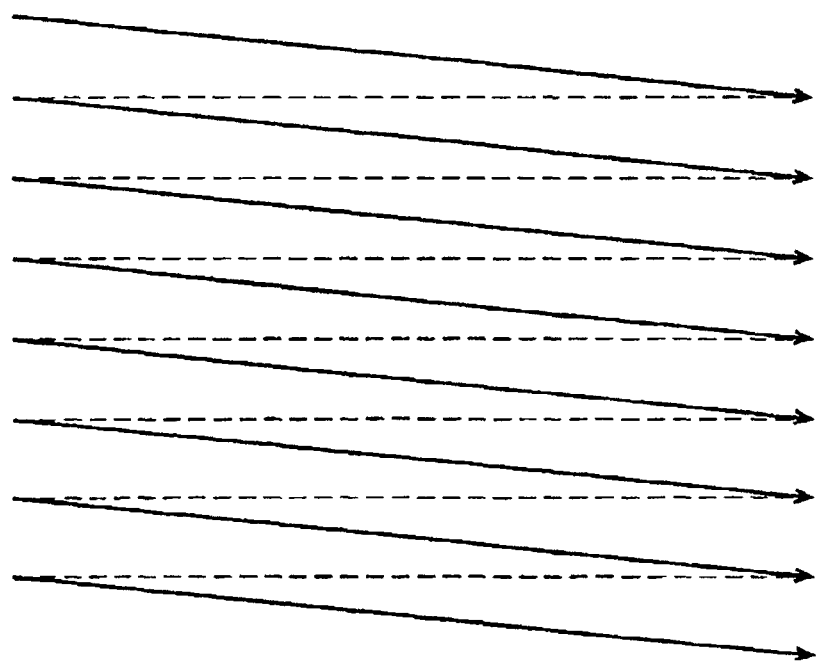
FIG. 31 is a diagram showing a unidirectional progressive scanning system.
Figure 32:
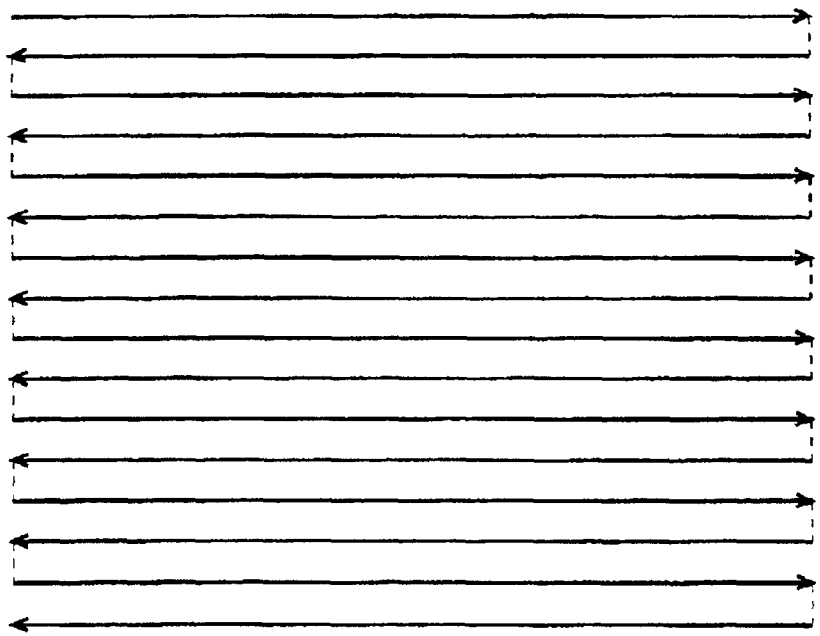
FIG. 32 is a diagram showing a bidirectional progressive scanning system.

FIG. 30 is a block diagram showing still another example of the configuration of a vertical velocity modulation circuit. A vertical velocity modulation circuit 9*b* shown in FIG. 30 is used for a video display apparatus of a unidirectional scanning system.

In FIG. 30, the vertical velocity modulation circuit 9*b* comprises a vertical correlation detection circuit 12, a frequency compensation circuit 18, and an amplifier 16. The configurations and the operations of the vertical correlation detection circuit 12 and the amplifier 16 are the same as the configurations and the operations of the vertical correlation detection circuit 12 and the amplifier 16 shown in FIGS. 5 and 26. Further, the configuration and the operation of the frequency compensation circuit 18 are the same as the configuration and the operation of the frequency compensation circuit 18 shown in FIG. 26.

When the vertical velocity modulation circuit 9*b* shown in FIG. 30 is used, vertical scanning modulation in which a scanning line sharply changes in a vertical edge and a horizontal edge of an image in unidirectional scanning, so that the quality of the image is not degraded is realized.

INDUSTRIAL APPLICABILITY

As described in the foregoing, a video display apparatus, a vertical velocity modulation apparatus, and a video display method according to the present invention can be suitably used for television receivers, display monitors, and so forth of a bidirectional scanning system and a unidirectional scanning system in which an image of high quality is displayed.

What is claimed is:

1. A video display apparatus comprising:
   a horizontal deflection circuit for deflecting an electron beam back and forth in the horizontal direction to form forward and backward scanning lines in the horizontal direction on a screen;
   a vertical deflection circuit for deflecting said electron beam in the vertical direction; and
   a vertical velocity modulation circuit for modulating the scanning speed in the vertical direction of an electron beam for successively forming scanning lines in the horizontal direction on a screen, wherein
   said vertical velocity modulation circuit comprises:
   a parallel scanning circuit for outputting a parallel scanning signal for making the forward and backward scanning lines formed by said horizontal deflection circuit parallel;
   a movement control circuit for producing a movement control signal for controlling the movement in the vertical direction of the scanning lines such that a part of the scanning line having a luminance which is not less than a predetermined value in a luminance change portion in the vertical direction on the basis of a luminance signal moves farther apart from a part of the adjacent scanning line having a lower luminance than said predetermined value;
   a synthesizing circuit for synthesizing the parallel scanning signal outputted by said parallel scanning circuit and the movement control signal produced by said movement control circuit; and
   a vertical velocity modulation coil for generating a magnetic field for modulating the scanning speed in the vertical direction of the electron beam on the basis of a signal synthesized by said synthesizing circuit.

2. The video display apparatus according to claim 1, wherein
   said movement control circuit comprises:
   a change portion detection circuit for detecting a luminance change portion in the vertical direction on the basis of the luminance signal;
   a movement distance output circuit for outputting as said movement control signal the distance of movement of the scanning line on the screen in the vertical direction in the luminance change portion detected by said change portion detection circuit on the basis of the luminance signal; and a time axis reversion circuit for reversing the time axis of the movement control signal outputted by said movement distance output circuit in backward scanning by said horizontal deflection circuit.

3. The video display apparatus according to claim 1, wherein
said vertical velocity modulation circuit further comprises:
a clamping circuit for clamping the movement control signal produced by said movement control circuit to a predetermined potential at predetermined timing.

4. The video display apparatus according to claim 1, wherein
said vertical velocity modulation circuit further comprises:
an amplifier for amplifying the signal synthesized by said synthesizing circuit; and
a gain control circuit for controlling the gain of said amplifier.

5. The video display apparatus according to claim 4, wherein said gain control circuit controls the gain of said amplifier on the basis of the number of the scanning lines formed on the screen by said horizontal deflection circuit.

6. The video display apparatus according to claim 4, wherein said gain control circuit controls the gain of said amplifier depending on the positions of the scanning lines formed on the screen by said horizontal deflection circuit.

7. The video display apparatus according to claim 1, wherein said movement control circuit comprises:
a movement distance output circuit for outputting the distance of movement on the screen of a part of the scanning line to be an object as the movement control signal on the basis of the difference between the luminance of a part of the scanning line a predetermined number of horizontal scanning periods ahead of and the luminance of a part of the scanning line the predetermined number of horizontal scanning periods behind the part of the scanning line to be the object and the level of the luminance of the part of the scanning line to be the object such that a part of the scanning line having a luminance which is not less than a predetermined value in a luminance change portion in the vertical direction moves farther apart from a part of the adjacent scanning line having a lower luminance than said predetermined value; and
a vertical velocity modulation coil for generating a magnetic field for modulating the scanning speed in the vertical direction of the electron beam on the basis of the movement control signal outputted from said movement distance output circuit.

8. The video display apparatus according to claim 7, wherein
said movement distance output circuit comprises:
a difference calculation circuit for calculating the difference between the luminance of the part of the scanning line the predetermined number of horizontal scanning periods ahead of and the luminance of the part of the scanning line the predetermined number of horizontal scanning periods behind the part of the scanning line to be the object;
a first signal output circuit for outputting a first movement distance signal on the basis of an output signal of said difference calculation circuit;
a second signal output circuit for outputting a second movement distance signal on the basis of the luminance of the part of the scanning line to be the object; and a multiplication circuit for multiplying the first movement distance signal outputted from said first signal output circuit and the second movement distance signal outputted from said second signal output circuit together, and outputting the result of the multiplication as said movement control signal.

9. The video display apparatus according to claim 8, wherein
said first signal output circuit sets the value of said first movement distance signal to zero when the value of the output signal of said difference calculation circuit is smaller than a predetermined value; and
said second signal output circuit sets the value of said second movement distance signal to zero when the luminance of the part of said scanning line to be the object is smaller than the predetermined value.

10. The video display apparatus according to claim 7, wherein the scanning line said predetermined number of horizontal scanning periods ahead of the part of the scanning line to be the object is the scanning line two horizontal scanning periods ahead of the part of the scanning line to be the object, and the scanning line said predetermined number of horizontal scanning periods behind the part of the scanning line to be the object is the scanning line two horizontal scanning periods behind the part of the scanning line to be the object.

11. The video display apparatus according to claim 7, wherein the scanning line said predetermined number of horizontal scanning periods ahead of the part of the scanning line to be the object is the scanning line one horizontal scanning period ahead of the part of the scanning line to be the object, and the scanning line said predetermined number of horizontal scanning periods behind the part of the scanning line to be the object is the scanning line one horizontal scanning period behind the part of the scanning line to be the object.

12. The video display apparatus according to claim 7, wherein
said vertical velocity modulation circuit further comprises:
a movement distance limitation circuit for limiting the distance of movement on the screen of the part of the scanning line such that the positions of the adjacent scanning lines are not replaced with each other by the movement of the part of the scanning line.

13. The video display apparatus according to claim 12, wherein
said movement distance limitation circuit limits the movement control signal outputted from said movement distance output circuit to half when the luminance of the part of the scanning line to be the object and the luminance of the part of the scanning line two horizontal scanning periods behind the part of the scanning line to be the object are not less than the predetermined value, and the luminance of the part of the scanning line two horizontal scanning periods ahead of, the luminance of the part of the scanning line three horizontal scanning periods ahead of, and the luminance of the part of the scanning line three horizontal scanning periods behind the part of said scanning line to be the object are less than the predetermined value, or when the luminance of the part of the scanning line to be the object and the luminance of the part of the scanning line two horizontal scanning periods ahead of the part of said scanning line to be the object are not less than the predetermined value, and the luminance of the part of the scanning line two horizontal scanning periods behind, the luminance of the part of the scanning line three horizontal scanning periods behind, and the luminance of the part of the scanning line three horizontal scanning periods ahead of the part of said scanning line to be the object are less than the predetermined value.

14. The video display apparatus according to claim 1, further comprising:
- a cathode ray tube; and
- an electron gun provided in said cathode ray tube and having a metal case,
- wherein a vertical velocity modulation coil is disposed in a position departing from the periphery of said metal case of said electron gun and around said cathode ray tube for generating a magnetic field for modulating the scanning speed in the vertical direction of the electron beam on the basis of said movement control signal produced by said movement control circuit.

15. The video display apparatus according to claim 14, further comprising a deflection yoke disposed in the position departing from the periphery of said metal case of said electron gun and around said cathode ray tube, and constituting said horizontal deflection circuit and said vertical deflection circuit,
- said vertical velocity modulation coil being arranged inside said deflection yoke.

16. A video display apparatus comprising:
- a horizontal deflection circuit for deflecting an electron beam in the horizontal direction to form scanning lines in the horizontal direction on a screen;
- a vertical deflection circuit for deflecting said electron beam in the vertical direction; and
- a vertical velocity modulation circuit for modulating the scanning speed in the vertical direction of the electron bean such that a part of the scanning line having a luminance which is not less than a predetermined value in a luminance change portion in the vertical direction moves farther apart from a part of the adjacent scanning line having a lower luminance than said predetermined value, wherein
- said vertical velocity modulation circuit comprises:
- a movement control circuit for producing the movement control signal for controlling the movement in the vertical direction of the scanning lines on the basis of the luminance signal;
- a frequency domain emphasis circuit for emphasizing a predetermined portion of a frequency domain of said movement control signal produced by said movement control circuit; and
- a vertical velocity modulation coil for generating a magnetic field for modulating the scanning speed in the vertical direction of the electron beam on the basis of said movement control signal emphasized by said frequency domain emphasis circuit, wherein
- said frequency domain emphasis circuit comprises:
- an extraction circuit for extracting said predetermined frequency domain of said movement control signal produced by said movement control circuit;
- an adjuster for adjusting the signal in said frequency domain extracted by said extraction circuit; and
- an adder for adding said movement control signal produced by said movement control circuit and the signal in said frequency domain adjusted by said adjuster together.

17. A vertical velocity modulation apparatus for modulating the scanning speed in the vertical direction of an electron beam for successively forming scanning lines in the horizontal direction on a screen, comprising:
- a movement control circuit for producing a movement control signal for controlling the movement in the vertical direction of the scanning lines such that a part of the scanning line having a luminance which is not less than a predetermined value in a luminance change portion in the vertical direction on the basis of a luminance signal moves farther apart from a part of the adjacent scanning line having a lower luminance than said predetermined value; and
- a vertical velocity modulation coil for generating a magnetic field for modulating the scanning speed in the vertical direction of the electron beam on the basis of the movement control signal produced by said movement control circuit;
- a parallel scanning circuit for outputting a parallel scanning signal for making forward and backward scanning lines formed on the screen by deflecting the electron beam back and forth parallel; and
- a synthesizing circuit for synthesizing the movement control signal produced by said movement control circuit and the parallel scanning signal outputted by said parallel scanning circuit,
- said vertical velocity modulation coil generating a magnetic field for modulating the scanning speed in the vertical direction of the electron beam on the basis of a signal synthesized by said synthesizing circuit.

18. The vertical velocity modulation apparatus according to claim 17, wherein
- said movement control circuit outputs the distance of movement on the screen of a part of the scanning line to be an object as said movement control signal on the basis of the difference between the luminance of a part of the scanning line a predetermined number of horizontal scanning periods ahead of the luminance of a part of the scanning line the predetermined number of horizontal scanning periods behind the part of the scanning line to be the object and the level of the luminance of the part of the scanning line to be the object.

19. A vertical velocity modulation apparatus for modulating the scanning speed in the vertical direction of an electron beam for successively forming scanning lines in the horizontal direction on a screen, comprising:
- a movement control circuit for producing a movement control signal for controlling the movement in the vertical direction of the scanning lines such that a part of the scanning line having a luminance which is not less than a predetermined value in a luminance change portion in the vertical direction on the basis of a luminance signal moves farther apart from a part of the adjacent scanning line having a lower luminance than said predetermined value;
- a vertical velocity modulation coil for generating a magnetic field for modulating the scanning speed in the vertical direction of the electron beam on the basis of the movement control signal produced by said movement control circuit; and
- a frequency domain emphasis circuit for emphasizing a predetermined portion of a frequency domain of said movement control signal produced by said movement control circuit, wherein
- said frequency domain emphasis circuit comprises:

an extraction circuit for extracting said predetermined frequency domain of said movement control signal produced by said movement control circuit, an adjuster for adjusting the signal in said frequency domain extracted by said extraction circuit; and an adder for adding said movement control signal produced by said movement control circuit and the signal in said frequency domain adjusted by said adjuster together.

20. A video display method comprising the steps of:

deflecting an electron beam back and forth in the horizontal direction and the vertical direction, to successively form forward and backward scanning lines in the horizontal direction on a screen; and modulating the scanning speed in the vertical direction of the electron beam for successively forming scanning lines in the horizontal direction on a screen, wherein the step of modulating said scanning speed comprises the steps of:

outputting a parallel scanning signal for making the forward and backward scanning lines parallel;

producing a movement control signal for controlling the movement in the vertical direction of the scanning lines such that a part of the scanning line having a luminance which is not less than a predetermined value in a luminance change portion in the vertical direction on the basis of a luminance signal moves farther apart from a part of the adjacent scanning line having a lower luminance than said predetermined value;

synthesizing said parallel scanning signal and said movement control signal; and generating a magnetic field for modulating the scanning speed in the vertical direction of the electron beam on the basis of a synthesized signal.

21. The video display method according to claim 20 wherein the step of producing said movement control signal comprises the steps of:

detecting the luminance change portion in the vertical direction on the basis of the luminance signal;

outputting the distance of movement of the scanning line on the screen in the vertical direction in said luminance change portion as said movement control signal on the basis of the luminance signal; and reversing the time axis of said movement control signal in said backward scanning.

22. The video display method according to claim 20, wherein the step of modulating said scanning speed comprises the step of:

clamping said movement control signal to a predetermined potential at predetermined timing.

23. The video display method according to claim 20, wherein the step of modulating said scanning speed further comprises the step of:

setting the distance of movement on the screen of the part of said scanning line to be the object on the basis of the difference between the luminance of the part of the scanning line the predetermined number of horizontal scanning periods ahead of and the luminance of the part of the scanning line the predetermined number of horizontal scanning periods behind the part of the scanning line to be the object and the level of the luminance of the part of the scanning line to be the object.

24. A video display method comprising the steps of:

deflecting an electron beam in the horizontal direction and the vertical direction, to successively form scanning lines in the horizontal direction on a screen; and modulating the scanning speed in the vertical direction of the electron beam such that a part of the scanning line having a luminance which is not less than a predetermined value in a luminance change portion in the vertical direction moves farther apart from a part of the adjacent scanning line having a lower luminance than said predetermined value, wherein the step of modulating said scanning speed comprises the steps of:

producing a movement control signal for controlling the movement in the vertical direction of the scanning lines on the basis of the luminance signal;

emphasizing a predetermined portion of a frequency domain of said movement control signal; and generating a magnetic field for modulating the scanning speed in the vertical direction of the electron beam on the basis of said movement control signal, wherein said step of emphasizing includes the steps of:

extracting said predetermined frequency domain of said produced movement control signal;

adjusting the signal in said extracted frequency domain; and adding said produce movement control signal and the adjusted signal in said frequency domain together.

* * * * *